(12) United States Patent
Lanoue et al.

(10) Patent No.: US 10,683,178 B2
(45) Date of Patent: Jun. 16, 2020

(54) SYSTEMS AND METHODS FOR PROCESSING EARTHEN SLURRIES

(71) Applicant: Vermeer Manufacturing Company, Pella, IA (US)

(72) Inventors: Corey Lanoue, Pella, IA (US); Brian Burge, Pella, IA (US); Brandon Storm, Pella, IA (US); Nathan Meyer, Knoxville, IA (US); Gregory Anderson, Pella, IA (US); Markus Terry, Pella, IA (US); Joshua Seibert, West Fargo, ND (US)

(73) Assignee: Vermeer Manufacturing Company, Pella, IA (US)

( * ) Notice: Subject to any disclaimer, the term of this patent is extended or adjusted under 35 U.S.C. 154(b) by 233 days.

(21) Appl. No.: 15/702,540

(22) Filed: Sep. 12, 2017

(65) Prior Publication Data
US 2018/0071662 A1 Mar. 15, 2018

Related U.S. Application Data

(60) Provisional application No. 62/452,706, filed on Jan. 31, 2017, provisional application No. 62/393,151, filed on Sep. 12, 2016.

(51) Int. Cl.
*B65G 67/24* (2006.01)
*C02F 11/121* (2019.01)
(Continued)

(52) U.S. Cl.
CPC ......... *B65G 67/24* (2013.01); *B01D 33/0346* (2013.01); *B01D 33/04* (2013.01);
(Continued)

(58) Field of Classification Search
CPC ...... B65G 67/24; B65G 69/287; B65G 65/42; B65G 15/30; F26B 17/023; F26B 17/04;
(Continued)

(56) References Cited

U.S. PATENT DOCUMENTS

| 1,151,243 A | 8/1915 | Britton |
| 2,251,990 A | 8/1941 | De Young |

(Continued)

FOREIGN PATENT DOCUMENTS

| CN | 101758997 A | 6/2010 |
| CN | 201851589 U | 6/2011 |

(Continued)

OTHER PUBLICATIONS

DR. -Ing. Gossling GmbH, "One supplier for all your needs", Brochure No. 6 174 0906 E, 32 pgs, Available before Sep. 12, 2016.

(Continued)

*Primary Examiner* — David C Mellon
(74) *Attorney, Agent, or Firm* — Armstrong Teasdale, LLP

(57) ABSTRACT

Systems and methods for processing earthen slurries such as slurries of earth cuttings and, in particular, systems and methods that involve two separation units for dewatering the slurry or that involve additive mixing units are disclosed. The systems and methods may include a conveyor such as a drag-slat conveyor that removes slurry from a holding tank at which the material is dumped and toward the separation units to allow the material to be continuously processed and dumped into the holding tank.

20 Claims, 22 Drawing Sheets

(51) Int. Cl.

| | | |
|---|---|---|
| *B01D 33/03* | (2006.01) | |
| *B01D 33/04* | (2006.01) | |
| *F26B 17/04* | (2006.01) | |
| *C02F 11/123* | (2019.01) | |
| *F26B 17/02* | (2006.01) | |
| *B65G 15/30* | (2006.01) | |
| *B65D 90/54* | (2006.01) | |
| *B65G 65/42* | (2006.01) | |
| *B65G 69/28* | (2006.01) | |
| *C02F 11/14* | (2019.01) | |

(52) U.S. Cl.
CPC ............ *B65D 90/54* (2013.01); *B65G 15/30* (2013.01); *B65G 65/42* (2013.01); *B65G 69/287* (2013.01); *C02F 11/121* (2013.01); *C02F 11/123* (2013.01); *F26B 17/023* (2013.01); *F26B 17/04* (2013.01); *B01D 2201/089* (2013.01); *C02F 11/14* (2013.01); *C02F 2201/008* (2013.01); *C02F 2301/08* (2013.01); *Y02W 30/32* (2015.05)

(58) Field of Classification Search
CPC .. C02F 11/123; C02F 11/121; C02F 2301/08; C02F 2201/008; C02F 11/14; B01D 33/04; B01D 33/0346; B01D 2201/089; B65D 90/54; Y02W 30/32
See application file for complete search history.

(56) References Cited

U.S. PATENT DOCUMENTS

| | | | |
|---|---|---|---|
| 3,074,369 A | 1/1963 | Luketa | |
| 3,378,152 A | 4/1968 | Warner | |
| 3,417,883 A | 12/1968 | Felts | |
| 3,561,351 A * | 2/1971 | French | B30B 9/127 100/37 |
| 3,606,050 A | 9/1971 | Silver | |
| 3,631,980 A | 1/1972 | Hamachek | |
| 3,647,047 A | 3/1972 | Rheinfrank, Jr. | |
| 3,677,407 A | 7/1972 | McIlvaine | |
| 3,713,499 A | 1/1973 | Arscott et al. | |
| 3,724,285 A | 4/1973 | Lapeyre | |
| 3,756,379 A | 9/1973 | Rheinfrank, Jr. | |
| 3,802,584 A | 4/1974 | Sackett et al. | |
| 3,967,719 A | 7/1976 | Kloefkom et al. | |
| 4,055,497 A | 10/1977 | Creps et al. | |
| 4,067,566 A | 1/1978 | Williams | |
| 4,069,982 A | 1/1978 | Brackbill | |
| 4,148,392 A | 4/1979 | Larson et al. | |
| 4,222,482 A | 9/1980 | Kelley | |
| 4,232,903 A | 11/1980 | Welling et al. | |
| 4,319,678 A | 3/1982 | Hesler | |
| 4,400,126 A | 8/1983 | Desourdy | |
| 4,480,702 A | 11/1984 | Kelly, Jr. | |
| 4,529,496 A | 7/1985 | Kruyer | |
| 4,651,836 A | 3/1987 | Richards | |
| 581,036 A | 4/1987 | Pike | |
| 4,696,353 A | 9/1987 | Elmquist et al. | |
| 4,747,481 A | 5/1988 | Gorlov et al. | |
| 4,836,302 A | 6/1989 | Heilhecker et al. | |
| 4,979,536 A | 12/1990 | Midkiff | |
| 5,080,721 A | 1/1992 | Flanigan et al. | |
| 5,259,717 A | 11/1993 | May | |
| 5,570,749 A | 11/1996 | Reed | |
| 5,671,762 A | 9/1997 | Hancock, Jr. et al. | |
| 5,921,399 A | 7/1999 | Bakula et al. | |
| 5,964,566 A | 10/1999 | Stewart et al. | |
| 5,996,387 A | 12/1999 | Williams | |
| 6,105,785 A | 8/2000 | Williams | |
| 6,220,445 B1 | 4/2001 | Williams | |
| 6,322,693 B1 | 11/2001 | Southall | |
| 6,407,523 B1 | 6/2002 | Allan | |
| 6,533,946 B2 | 3/2003 | Pullman | |
| 6,668,487 B2 | 12/2003 | Vesey | |
| 6,835,315 B2 | 12/2004 | Fox et al. | |
| 6,910,587 B2 | 6/2005 | Seyffert | |
| 6,966,740 B2 | 11/2005 | Mast et al. | |
| 6,974,019 B2 | 12/2005 | Lapeyre et al. | |
| 7,198,318 B2 | 4/2007 | Dilluvio | |
| 7,306,057 B2 | 12/2007 | Strong et al. | |
| 7,438,188 B2 | 10/2008 | Stolworthy | |
| 7,686,964 B2 | 3/2010 | Lownertz | |
| 7,935,261 B2 | 5/2011 | Jones et al. | |
| 8,267,100 B2 | 9/2012 | McCormick et al. | |
| 8,397,902 B1 | 3/2013 | Geraets | |
| 8,464,971 B1 | 6/2013 | Munisteri | |
| 8,684,161 B2 | 4/2014 | Gausman et al. | |
| 8,701,687 B2 | 4/2014 | MacKinnon | |
| 9,169,087 B2 | 10/2015 | Mackenzie et al. | |
| 9,254,960 B2 | 5/2016 | Pribyl | |
| 9,382,075 B1 | 7/2016 | Maxwell | |
| 10,017,097 B2 | 7/2018 | Ozinga | |
| 2001/0042721 A1 | 11/2001 | Hodges et al. | |
| 2003/0164235 A1 | 9/2003 | Leeson et al. | |
| 2007/0072660 A1 | 3/2007 | Day et al. | |
| 2007/0108025 A1 | 5/2007 | Boudreau | |
| 2008/0277248 A1 | 11/2008 | Damkjaer | |
| 2009/0133723 A1 | 5/2009 | Frutiger | |
| 2010/0326655 A1 | 12/2010 | Jones et al. | |
| 2011/0253175 A1 | 10/2011 | Petter et al. | |
| 2012/0012138 A1 | 1/2012 | Garrett | |
| 2016/0083188 A1 | 3/2016 | Pribyl | |
| 2017/0028366 A1 | 2/2017 | Pullman et al. | |
| 2018/0086655 A1 | 3/2018 | Malcolm | |

FOREIGN PATENT DOCUMENTS

| | | |
|---|---|---|
| CN | 202432531 U | 9/2012 |
| CN | 102723683 A | 10/2012 |
| CN | 102774635 A | 11/2012 |
| CN | 202688158 U | 1/2013 |
| CN | 103993581 A | 8/2014 |
| CN | 203962864 U | 11/2014 |
| CN | 104710088 A | 6/2015 |
| CN | 204952428 U | 1/2016 |
| DE | 202010000079 U1 | 6/2010 |
| DE | 102013000512 A1 | 8/2013 |
| DE | 102012021317 A1 | 4/2014 |
| GB | 191402468 A | 1/1915 |
| GB | 674121 A | 6/1952 |
| JP | H0290911 A | 3/1990 |
| KR | 100417762 B1 | 2/2004 |
| KR | 101365734 B1 | 2/2014 |
| WO | 9640545 A1 | 12/1996 |
| WO | 0032385 A1 | 6/2000 |
| WO | 2004046498 A1 | 6/2004 |
| WO | 2010037185 A1 | 4/2010 |
| WO | 2012151127 A1 | 11/2012 |
| WO | 2013120475 A2 | 8/2013 |
| WO | 2016051214 A1 | 4/2016 |
| WO | 2017027930 A1 | 2/2017 |

OTHER PUBLICATIONS

Ditchwitch, "MR90 Mud Recycler: Fluid Management" The Charles Machine Works, Inc. (2014), 3 pgs.

Jorgensen Conveyors, Inc., "Drag Flight/Scraper Conveyors", available before Sep. 12, 2016, 4 pgs.

IHC Mining, "IHC Mining—Dredging Systems for Wet Mining", Aug. 30, 2016, 3 pgs.

Thunder Prodcuts, "Thunder Prescreen: A Wyo-Ben Product", 3 pgs, Available before Sep. 12, 2016.

Bartek Construction, "Subsurface Utility Engineering", 3 pgs., retrieved from http://www.bartektexas.com/services, Available before Sep. 12, 2016.

Drilling Waste Management Information System, "Fact Sheet—The First Step: Separation of Mud from Cuttings", 2 pgs., retrieved from http://web.ead.anl.gov/dwm/techdesc/sep/index.cfm, Available before Sep. 12, 2016.

(56) References Cited

OTHER PUBLICATIONS

Drilling Waste Management Information System, "Fact Sheet—Beneficial Reuse of Drilling Wastes", 2 pgs., retrieved from http://web.ead.anl.gov/dwm/techdesc/reuse/index.cfm, Available before Sep. 12, 2016.
Frutiger, "Wheel Washing", 7 pgs., retrieved from http://www.mobydick.com/en/product-groups-wheel-wash/conline/, Available before Sep. 12, 2016.
Waste + Water Management Australia, "Vac Group: An Australian Success Story" (Oct. 2016) 2 pgs.
Kringstad Ironworks, Inc., "Beet Piler Catalog: End Dumps" (2009) 1 pg.
Lee and Tracy, "First Time at the Beet Harvest—Days 5 through 6", Camper Chronicles (Oct. 5, 2016), 17 pgs.
"North Dakota Sugar Beet Bulk Storage Operation—Beet Piling" (Oct. 30, 2012), https://www.youtube.com/watch?v=cVjdx5oNTgA; Scholl, J.
Kemtron 200HD2 Packaged Fluid Management System, Available before Sep. 12, 2016.
Kemtron 100HD2 Packaged Fluid Management System, Available before Sep. 12, 2016.
Kemtron Culling and Drilling Fluid Processing System, Available before Sep. 12, 2016.
http://www.dccleaningsystem.com/category/related-industries/hddcbm-drilling-mud-recycling/, DC Cleaning System, Available before Sep. 12, 2016.

\* cited by examiner

SYSTEMS AND METHODS FOR PROCESSING EARTHEN SLURRIES

CROSS-REFERENCES TO RELATED APPLICATIONS

The present application claims the benefit of U.S. Provisional Patent Application No. 62/393,151, filed Sep. 12, 2016 and U.S. Provisional Patent Application No. 62/452,706, filed Jan. 31, 2017, each of which is incorporated herein by reference in its entirety.

FIELD OF THE DISCLOSURE

The field of the disclosure relates to systems and methods for processing earthen slurries such as slurries of earth cuttings and, in particular, systems and methods that include a dumping station for receiving earthen slurries from transport vehicles and downstream processing systems that receive material from the dumping station for treatment of the earthen slurry (e.g., dewatering and/or additive mixing).

BACKGROUND

Various subsurface infrastructure such as power cables, water lines, gas lines, and product piping may be installed by drilling operations. Horizontal directional drilling is a trenchless drilling technique often used in urban areas and for crossing below roads or waterways. Drilling involves formation of a pilot hole along the drill path. The pilot hole is then reamed out to the size of the utility. During drilling, a viscous drilling fluid that typically contains bentonite or polymer is pumped to the cutting head. The drilling fluid, for example, cools the cutting head and carries drill cuttings away from the drill bore. Spent drilling fluid may be collected by use of vacuum excavators. Such vacuum excavators may also collect fluid from vertical well drilling.

Vacuum excavators are also used in a process commonly referred to as "potholing", "daylighting" or "locating." Potholing involves use of high pressure water that loosens soil to create a hole to visually locate utilities. The mud slurry that is produced is removed by a vacuum and sent to a spoil tank. High pressure systems may also be used to cut trenches with the resulting slurry being sent to a spoil tank of a vacuum excavator. Vacuum excavators may also be used to remove water/mud slurries from valve and meter boxes to provide access to the boxes.

The raw slurry produced during drilling or potholing, typically collected by vacuum excavators, is conventionally landfilled or dumped at a designated disposal site. Landfill disposal of slurries containing a large amount of water may be relatively expensive compared to disposal of solids alone. Further, tightening regulations may limit disposal options for such slurries.

A need exists for dewatering systems and methods for processing earthen slurries such as drill cuttings and cuttings from potholing. A need exists for systems and methods that allow slurries to be dumped with ease and that allow for multiple loads to be dumped while processing slurries. A need also exists for systems and methods that allow the cuttings to be processed without blinding and with reduced wear during the dewatering process.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a system for processing earthen slurries having a liquid fraction and a solid fraction. The system includes a dumping station for receiving slurries. A first separation unit receives slurry from the dumping station. The first separation unit has openings for separating the solids fraction from the liquid fraction. The first separation unit has an outlet for discharging a first effluent that passes through the first separation unit. The system includes a second separation unit for separating the solids fraction from the liquid fraction from the first effluent from the first separation unit. The first separation unit has openings with a size greater than the size of the openings of the second separation unit. The system includes a collection system for collecting second effluent that passes through the openings of the second separation unit.

Another aspect of the present disclosure is directed to a mobile system for processing earthen slurries having a liquid fraction and a solid fraction. The system includes a holding tank and a drag-slat conveyor having a loading end and a discharge end. The loading end extends into the holding tank to remove slurry from the holding tank. A separation unit is disposed below the discharge end of the drag-slat conveyor for separating the solids fraction from the liquid fraction.

Yet a further aspect of the present disclosure is directed to a mobile system for processing earthen slurries. The system includes a holding tank and a drag-slat conveyor having a loading end and a discharge end. The loading end extends into the holding tank to remove slurry from the holding tank. An additive mixing unit is disposed below the discharge end of the drag-slat conveyor.

Yet another aspect of the present disclosure is directed to a method for dewatering earthen slurries having a liquid fraction and a solids fraction. A first vehicle is positioned at a dumping station for receiving slurries. The dumping station includes a holding tank. Slurry is ejected from the first vehicle into the holding tank. Slurry is conveyed from the holding tank to a first separation unit. The first separation unit separates the solids fraction from the liquid fraction to form a first solids-depleted effluent. The first solids-depleted effluent is introduced into a second separation unit for separating material from the first solids-depleted effluent to form a second solids-depleted effluent. The second solids-depleted effluent comprises less solids than the first solids-depleted effluent.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
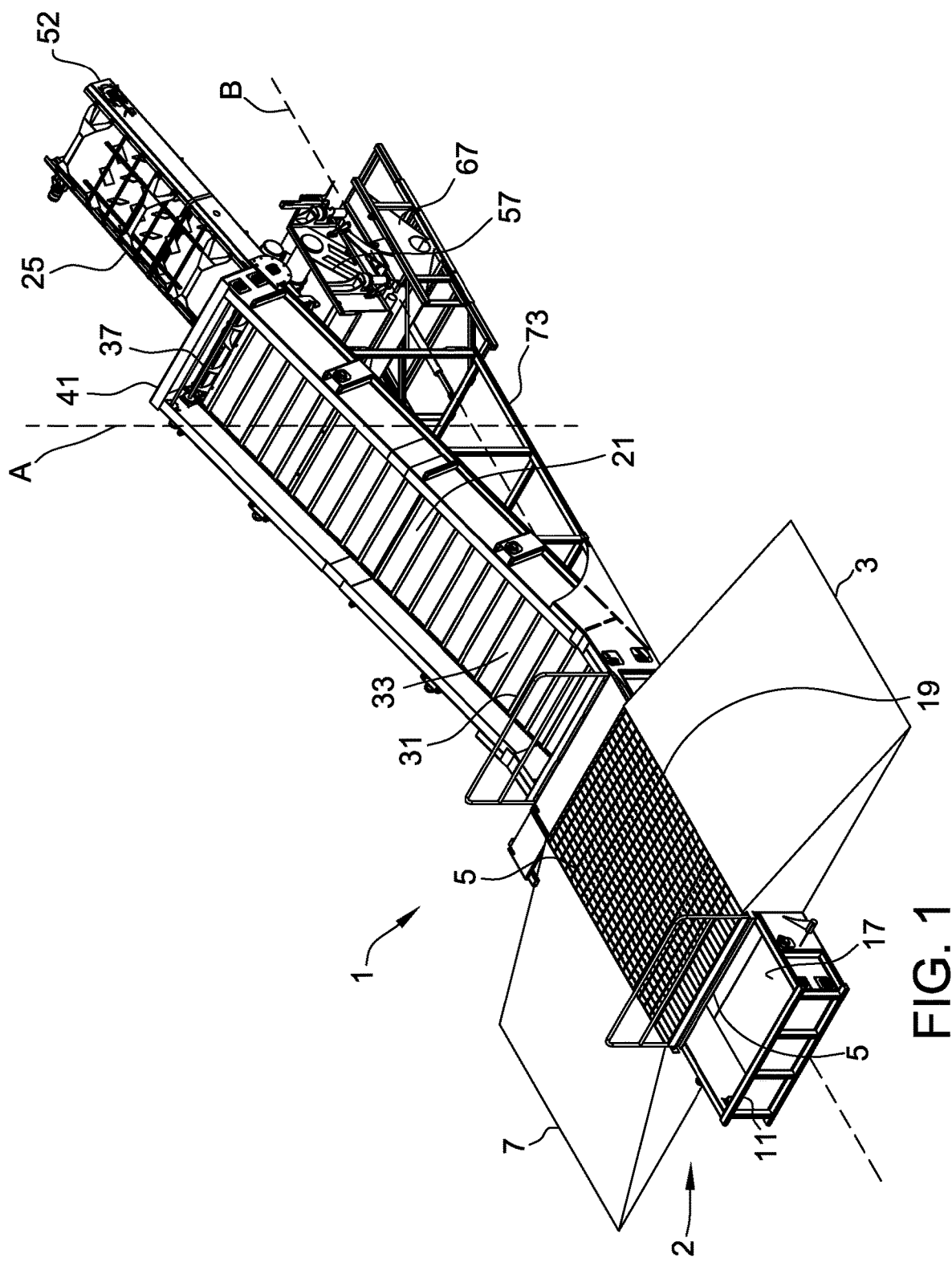
FIG. 1 is a perspective view of a system for processing slurries of earth cuttings.

A system 1 for processing earthen slurries is shown in FIG. 1. The system 1 includes a dumping station 2 to receive slurries from slurry transport vehicles such as vacuum excavators (not shown). The dumping station 2 is configured to receive slurries from vehicles in three configurations—by driving a vehicle forward or reverse onto a first ramp 3 and onto a support platform 5, by driving a vehicle onto a second ramp 7 and onto the support platform 5 or by backing a vehicle up to an open end 11 of the system 1 to unload slurry from a vehicle on the ground. As an alternative to fabricated ramps, earthen ramps may be formed at the site or the dumping station may be partially buried to allow vehicles to drive over the support platform 5.

The dumping station 2 includes a holding tank 17 for containing slurry after dumping. The ramps 3, 7, may be pivotally attached to the holding tank 17 (or may be otherwise retracted) to reduce the width of the system 1 to allow the system 1 to be transported to different sites. Alternatively, the ramps 3, 7 may be removably attached to the holding tank 17 to allow the ramps 3, 7 to be separated from the holding tank 17 for transport.

The support platform 5 is configured to permit flow of the slurry into the holding tank 17 below the support platform. In the illustrated embodiment, the dumping station 2 includes one or more grates 19 which support the transport vehicle and allow slurry to be discharged into the holding tank 17. The open end 11 of the dumping station 2 may also include a grate (not shown) or may be open.

In this regard, the earthen slurry may be transported and offloaded from vehicles known in the art as vacuum excavators and, particularly, hydro excavators. The earthen slurry that is processed may be any mixture of suspended solids that is transported to the system by a transport vehicle. In some embodiments, the slurry comprise earth and water such as cuttings from a drill site (vertical drill or horizontal drill site) or from potholing, hydro-excavation trenching and/or from other excavation or mining sites in which earthen solids suspended in water are involved. The earthen slurry may include liquid and earth that was loosed during drilling/potholing or a mining operation. The slurry may also include various additives that are added to the water for drilling purposes (e.g., to modify the viscosity of the fluid) such as bentonite and/or polymers. Generally, the slurry should be distinguished from other types of materials that are processed in conveying operations such as particulates such as grain and aggregate material. The slurry may include at least 0% solids, at least about 10% solids, at least about 30% solids or even at least about 50% solids (e.g., from about 0% to about 70% solids or from about 10% to about 70% solids). The slurry generally includes a liquid fraction (which may include suspended and dissolved solids) and a solids fraction.

In some embodiments, the holding tank 17 is sized to hold at least about 1,000 gallons of slurry or at least about 1,250 gallons, at least about 1,500 gallons or at least about 1,750 gallons (e.g., from about 1,000 gallons to about 3,000 gallons, from about 1,250 gallons to about 3,000 gallons or from about 1,500 gallons to about 2,500 gallons). In some embodiments, the holding tank 17 is sized to hold the largest load that is conventionally hauled on vacuum excavators such as at least about 3,000 gallons.

The dumping station 2 includes a conveyor 21 configured for removing slurry from the holding tank 17 and moving slurry toward a first separation unit 25. The conveyor 21 had a loading end that extends into the holding tank 17 to remove the slurry from the tank. In the illustrated embodiment, the conveyor 21 is a drag-slat conveyor that lifts and conveys slurry forward. Drag-slat conveyors use a number of slats 31 (which may also be referred to as "bars" or "flights") to drag slurry along the floor of the holding tank 17 and up the floor 33 of the conveyor. In some embodiments, the drag-slat conveyor 21 and holding tank 17 are part of the same unit, i.e., are integrally connected.

Figure 2:
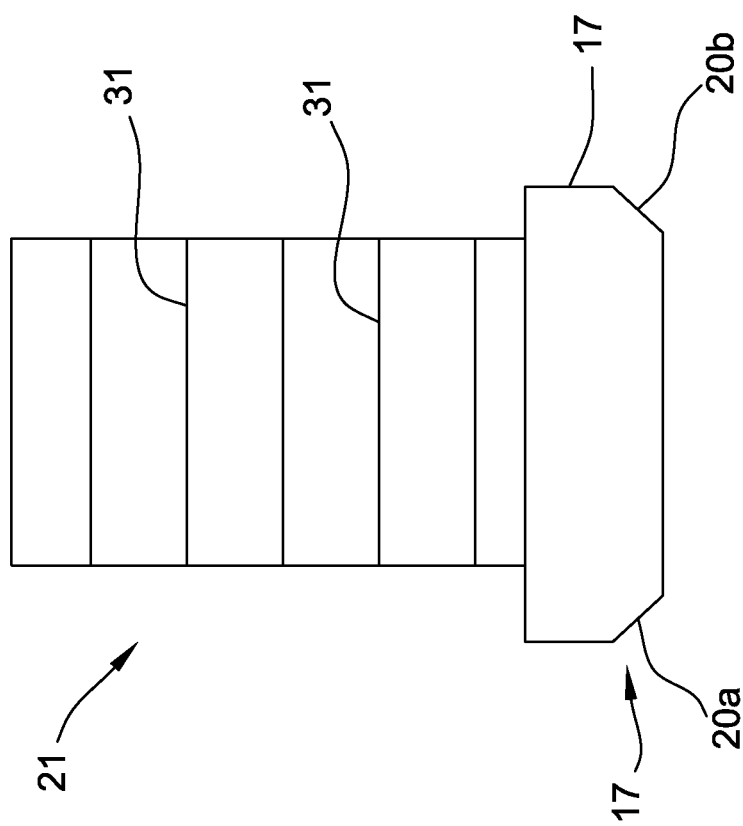
FIG. 2 is a front view of an embodiment of the holding tank and conveyor with the holding tank having angular portions.

In some embodiments and as shown in FIG. 2, the holding tank 17 may have two angular portions 20a, 20b that angle inward toward the bottom of the tank 17 to allow the width of the slats 31 to be reduced.

Figure 7:
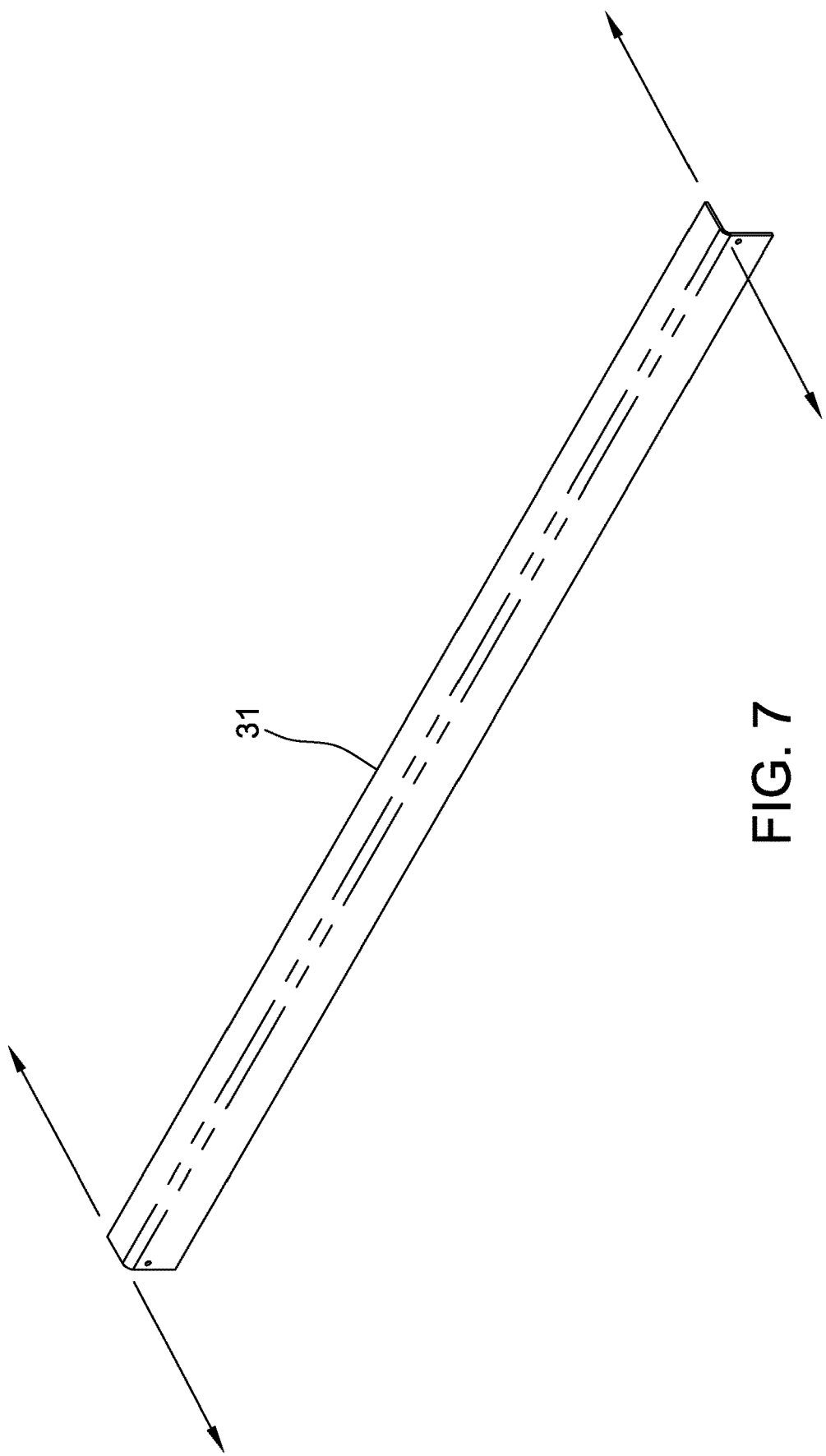
FIG. 7 is a perspective view of a slat of a conveyor for removing slurry from a holding tank of the system.
Figure 8:
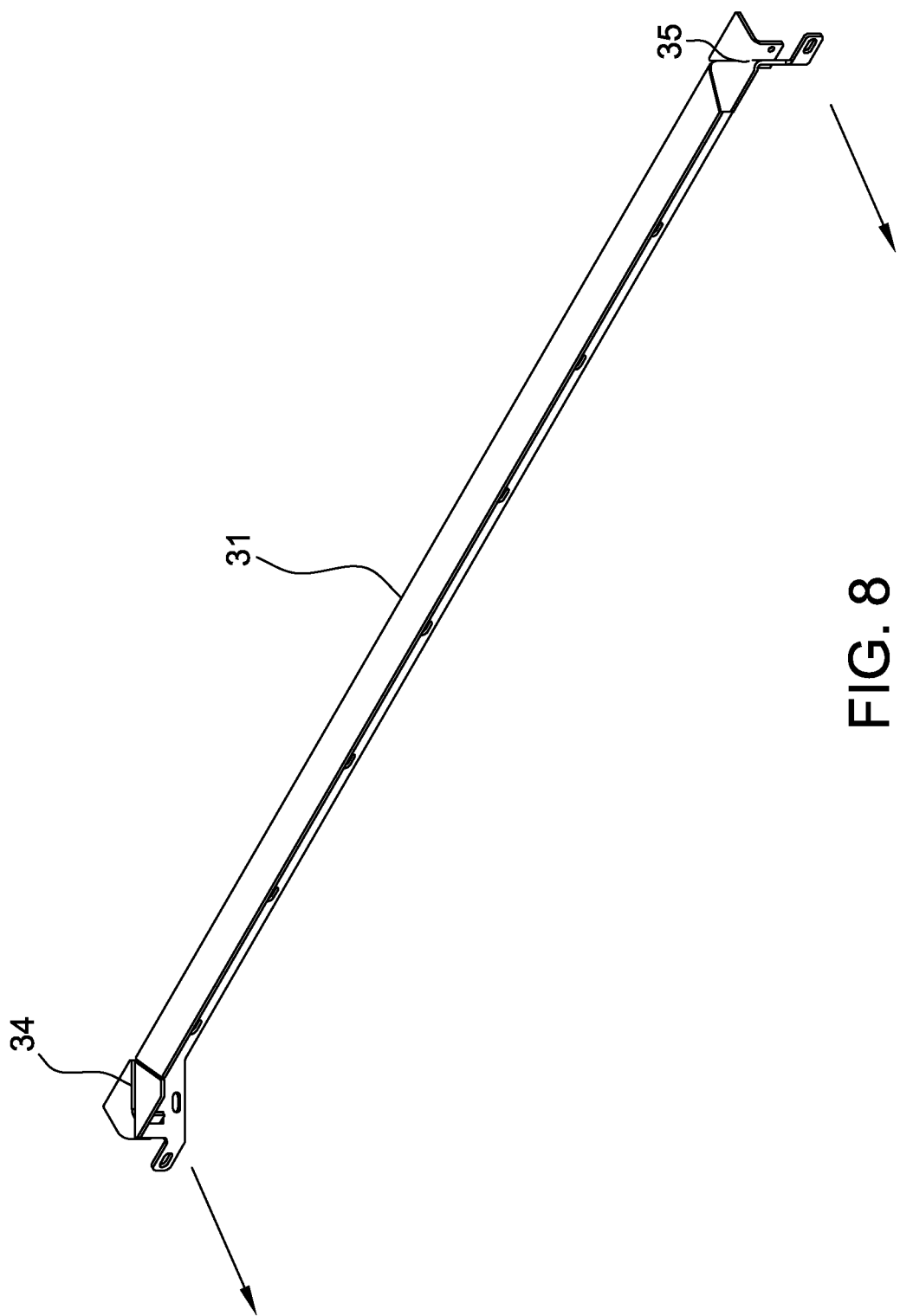
FIG. 8 is another embodiment of the slat having flare-out portions to cup slurry.
Figure 9:
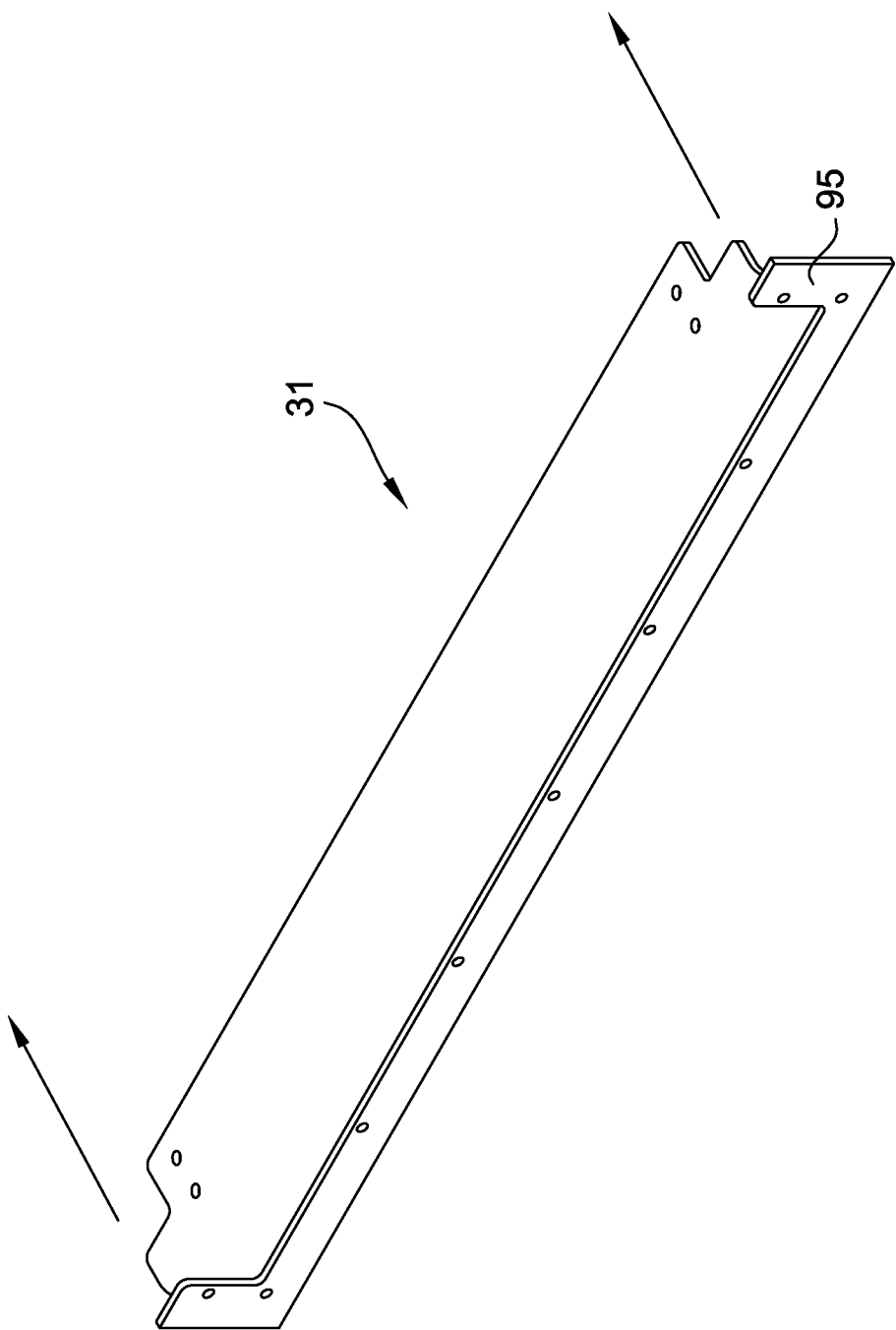
FIG. 9 is another embodiment of the slat having a wiper.

As shown in FIG. 1, the conveyor 21 is angled to move the material vertically (relative to vertical axis A) and horizontally (relative to longitudinal axis B) toward a discharge end 41 of the conveyor 21. In some embodiments and as shown in FIG. 7, the slats 31 may have a vertical leg and a horizontal leg that provides rigidity to the slats. The slats 31 may travel and be used to push material forward in either direction as shown by arrows. In some embodiments, the ends 34, 35 (FIG. 8) of the slats 31 are angled forward relative to the direction of travel of the slats on the bottom course to form flare-out portions that "cup" slurry to push slurry forward. The slats 31 may be flexible (e.g., rubber or other soft material liner 95 (FIG. 9)) to allow them to seal and scrape the floor of the holding tank 17 and conveyer 21 to better propel material forward.

In other embodiments, a bucket conveyor is used to move material from the holding tank 17 to the first separation unit 25.

The dumping station 2 includes a discharge auger 37 (FIG. 10) positioned at a discharge end 41 of the drag-slat conveyer 21. In the illustrated embodiment, the conveyor 21 is wider than the first separation unit 25. The discharge auger 37 is configured to aggregate the slurry material together from conveyor 21 into outlets 45 to reduce the width at which the material is discharged to accommodate the reduced width of the first separation unit 25. The discharge auger 37 may contain alternating reverse pitch sections (e.g., two or four reverse pitch sections) to move material toward the center of the auger 37 and through the discharge outlets 45. Alternatively, the auger 37 may be monopitch to direct material to a desired discharge outlet. The discharge outlets 45 are disposed above the first separation unit 25 to allow slurry to fall onto the unit 25. In the illustrated embodiment, the discharge outlets 45 are disposed toward the middle of the discharge auger 37. In other embodiments, the discharge outlets 45 may be disposed at or toward the ends of the discharge auger 37.

Figure 3:
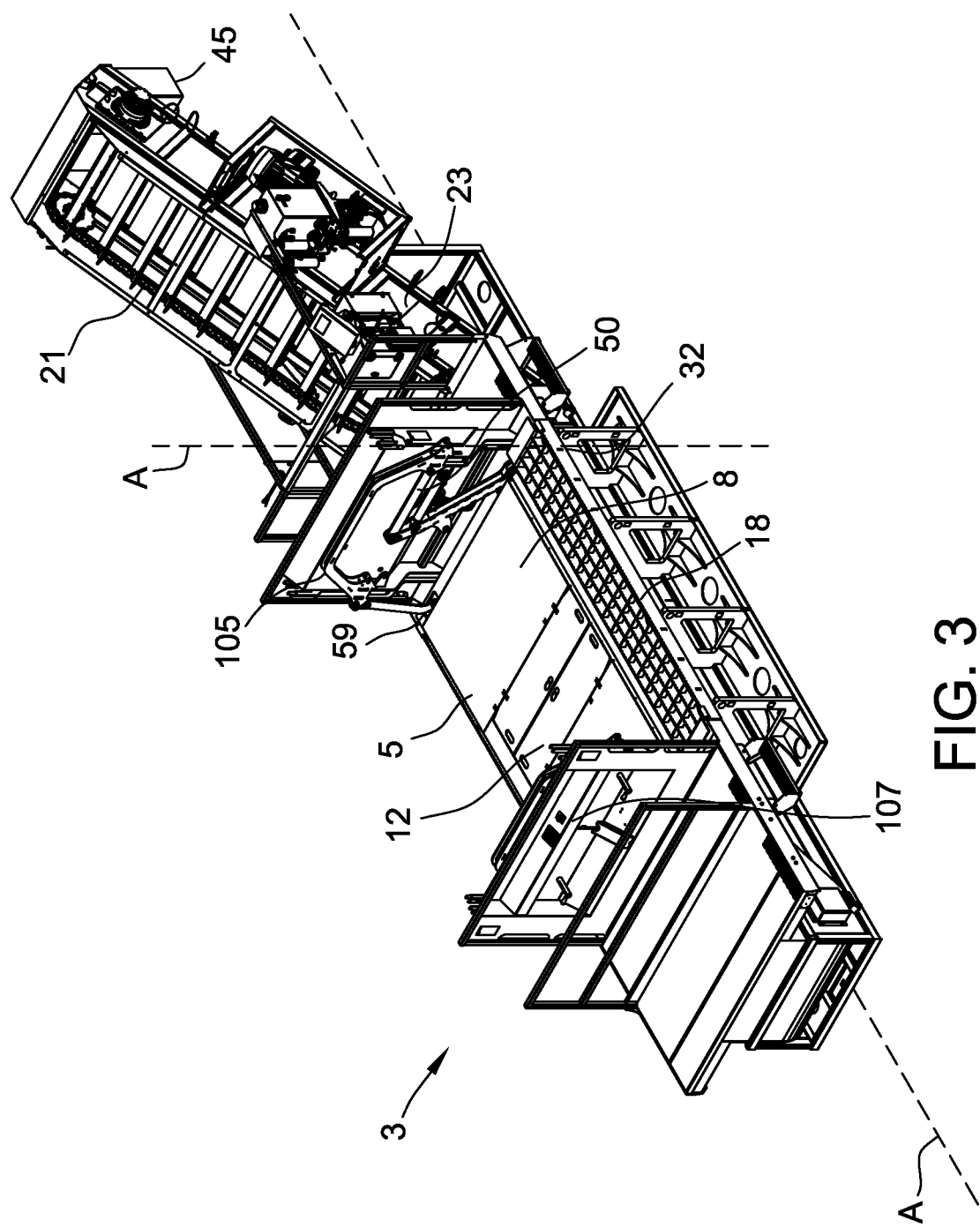
FIG. 3 is a perspective view of an embodiment of a dumping station for receiving earthen slurries having a hatch in a closed position.
Figure 4:
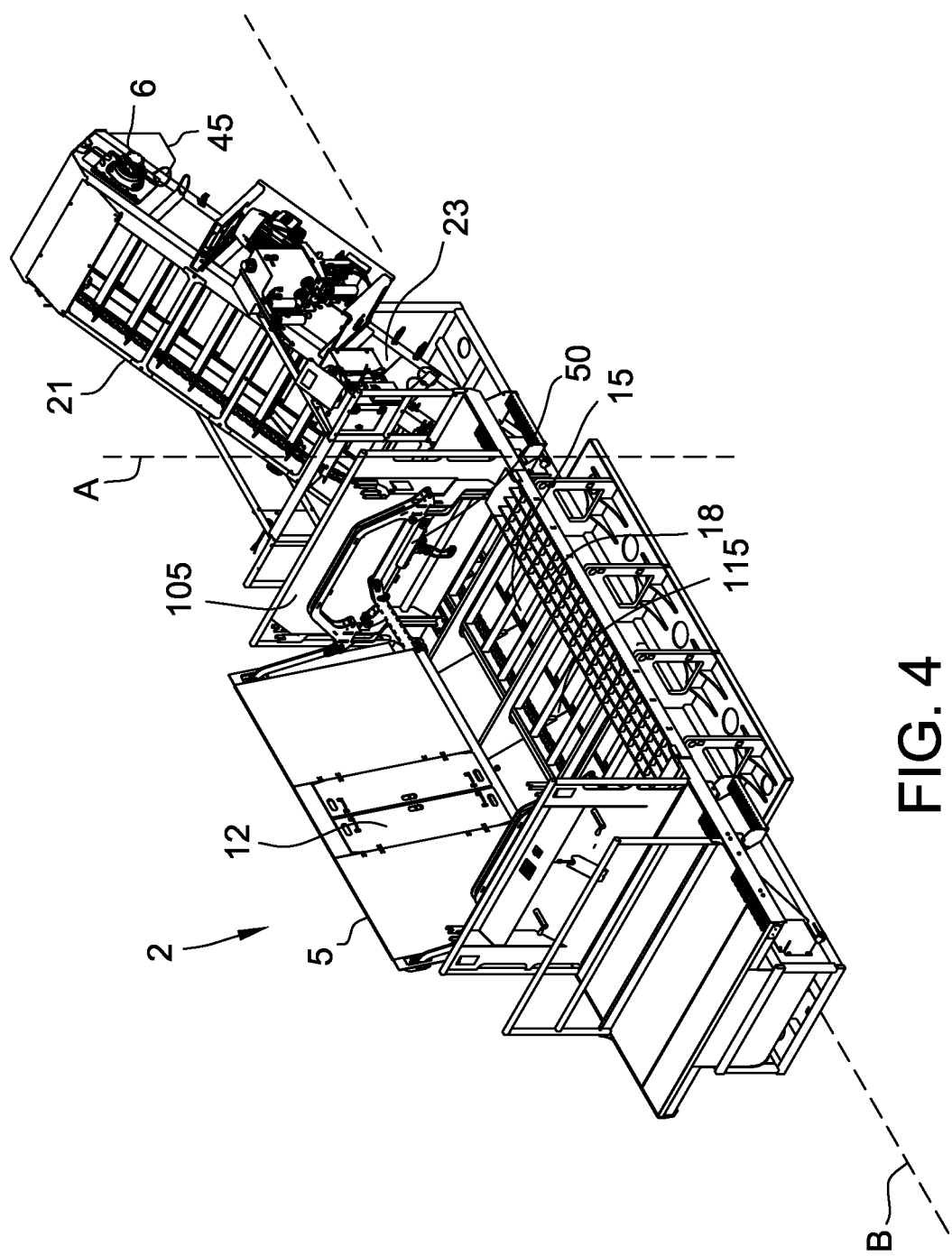
FIG. 4 is a perspective view of the dumping station with the hatch in an open position.
Figure 5:
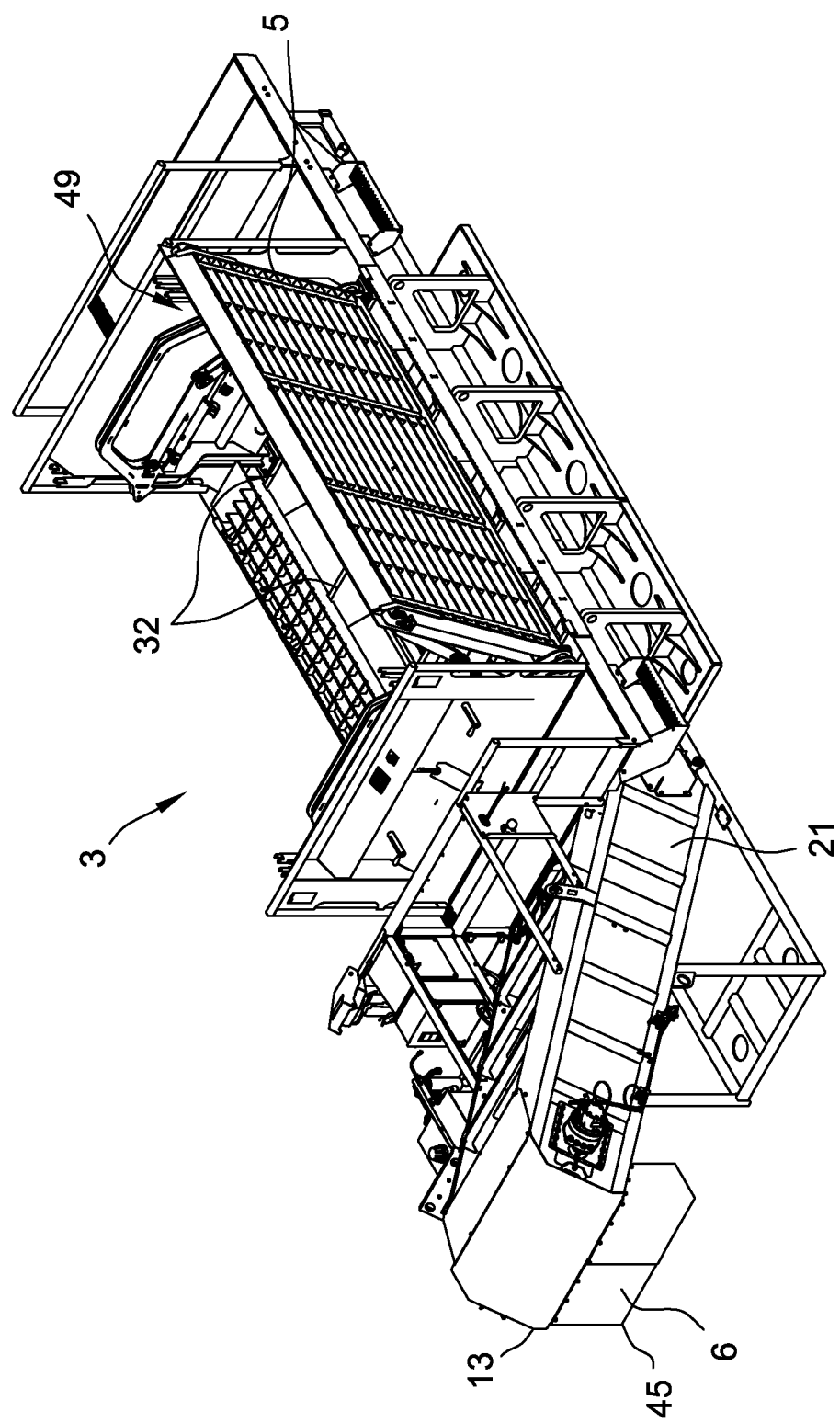
FIG. 5 is another perspective view of the dumping station with the hatch in the open position.

Another embodiment of a dumping station 2 is shown in FIG. 3. The dumping station 2 may be partially buried such that the driving surface 8 is level with the ground. Alternatively, the dumping station 2 may include ramps (e.g., attached, foldable ramps or earthen ramps). The dumping station 2 includes a hatch 5 disposed above a holding tank 15. The hatch 5 is movable between a closed position in which vehicles travel over a driving surface 8 formed by the hatch 5 and a grate 18 and a hatch open position (FIG. 4) in which the hatch 5 uncovers a holding tank opening 115 and acts as a splash guard during dumping. The hatch 5 is actuated by actuating assemblies 49 (FIG. 5) and 50 (FIG. 4). The dumping station 2 includes first and second dumping station sidewalls 105, 107 which are orthogonal to the hatch 5 in the open position. The sidewalls 105, 107 also act as a splash guards. Together, the hatch 5 and sidewalls 105, 107 provide a three sided splash barrier with a partial fourth side formed by the dumping vehicle while dumping material.

The hatch 5 also includes doors 12 which may be opened when the hatch 5 is in the closed position to receive earthen slurry (e.g., slurry with less than about 25% solids) into the tank 15. The dumping station 2 includes frame members 32 for supporting the weight of vehicles as they cross the driving surface 8 (FIG. 3).

Figure 6:
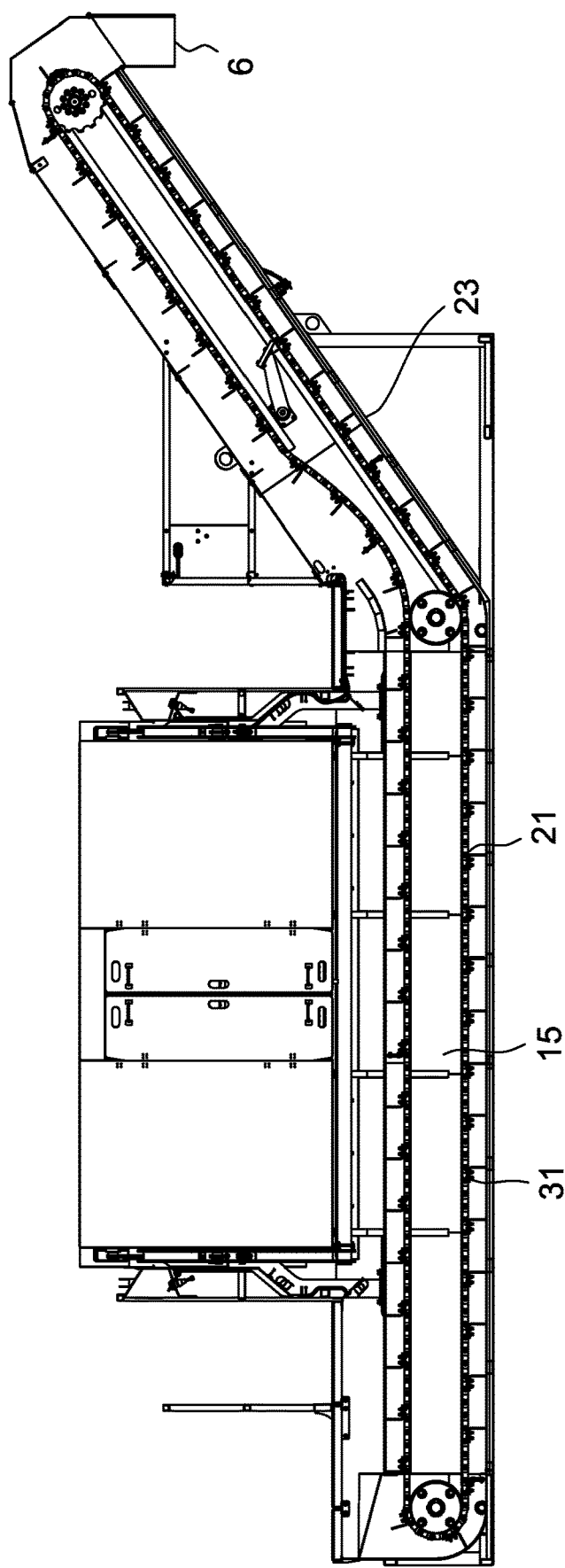
FIG. 6 is a cross-section side view of the dumping station with the hatch in the open position.
Figure 22:
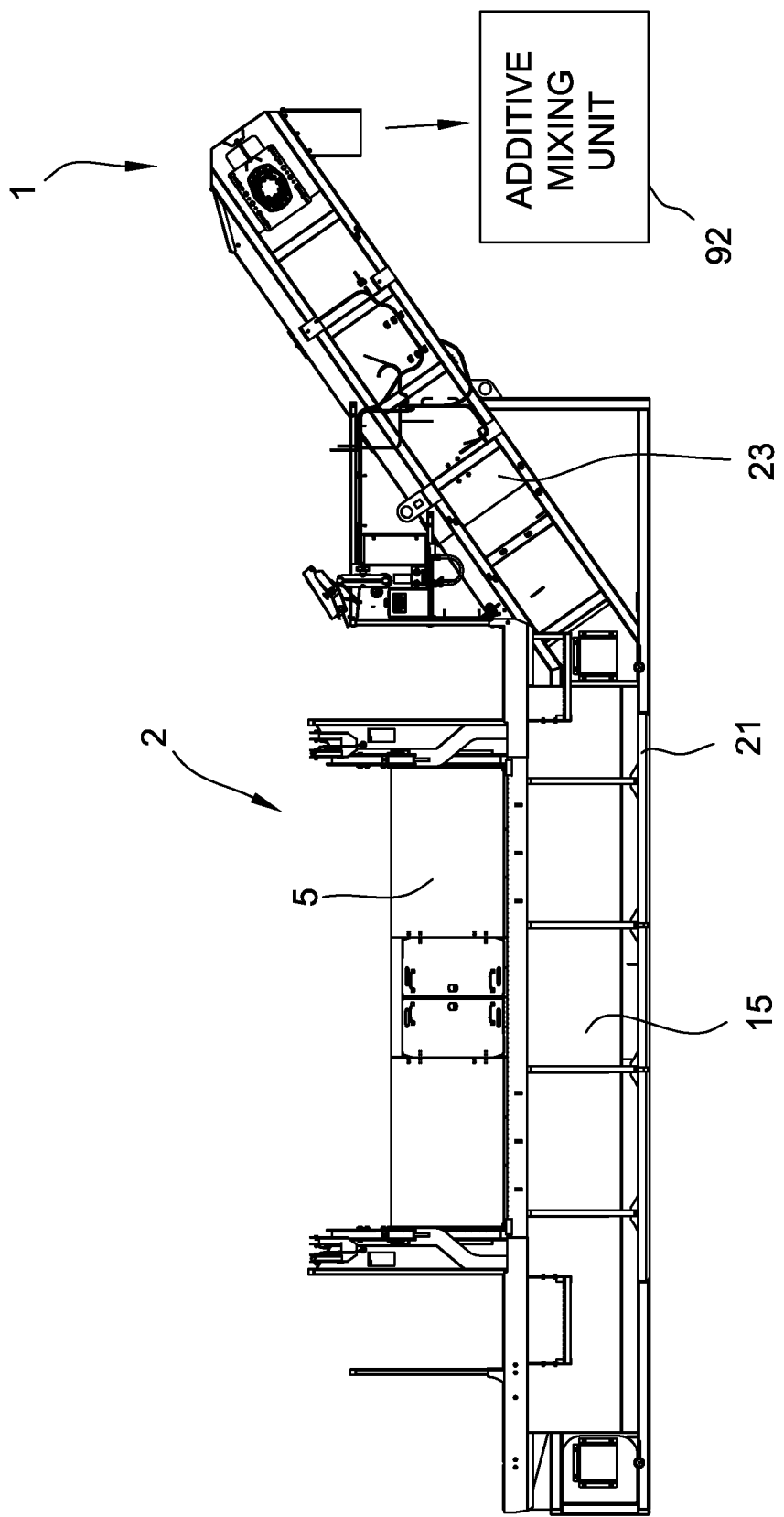
FIG. 22 is a side view of the dumping station and an additive mixing unit.

As shown in FIG. 6, the dumping station 2 includes a conveyor 21 that extends into the holding tank 15 to remove material from the tank 15 and convey it to an outlet 45. The conveyor 21 may be a drag-slat conveyor having slats 31 which scrape material from the floor of the holding tank 15. The conveyor 21 has a leg portion 23 that moves earthen slurry upward toward the outlet 45. Material is discharged through chute 6. Material may be discharged onto the first separation unit 25 (FIG. 1) or into an additive mixing unit 92 (FIG. 22).

The separation unit 25 (FIG. 1) defines a back end 52 of the system 1. In the illustrated embodiment, the separation unit 25 angles upward toward the back end 52 of the system (i.e., towards the discharge end of the unit 25) to promote separation of liquid from the slurry. The longitudinal axis B (FIG. 1) extends through the front end 11 and back end 52 of the system.

Figure 10:
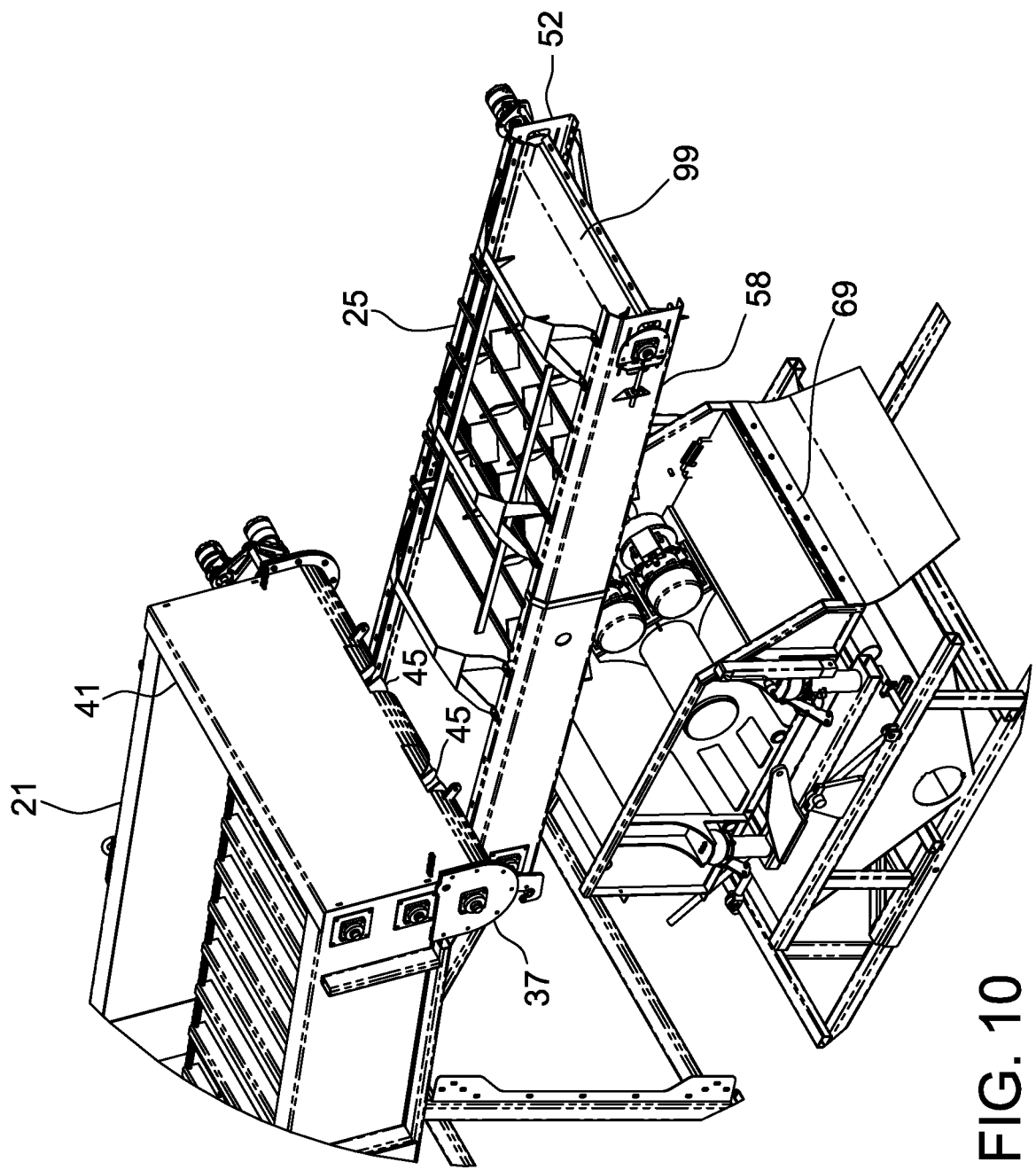
FIG. 10 is a detailed perspective view of a discharge auger of the system.

The first separation unit 25 has mesh openings 80 (FIG. 20) that act to separate the solid fraction from the liquid fraction. The first separation unit 25 may remove larger solids and un-hydrated soil clumps which helps prevent downstream separation units from blinding (e.g., pluggage of mesh openings) and abrasive wear and damage. As shown in the Figures and in accordance with some embodiments of the present disclosure, the first separation unit 25 is a flat wire belt conveyor. Such flat wire belt conveyors may include spaced wires or rods which form an open mesh in the belt that allow for liquids and particles that fit through the mesh openings to pass through the mesh. In various embodiments, the mesh size of the belt may be from about 0.25 cm to about 5 cm or from about 0.5 cm to about 3 cm. Liquid and small solids that pass through the mesh fall through the top course 53*a* (FIG. 11) of the belt, land on the bottom course 53*b* of mesh (i.e., the return) and fall through the bottom course of mesh onto a conveyor floor or "chute" 58 (FIG. 10). The belt 53 may rest on the conveyor floor 58 and scrape material toward the liquid discharge end of the separation unit 25. Solids that do not pass through the openings are carried forward by the belt toward solids discharge 99. While the belt 53 is shown as being a solid belt in the Figures for simplicity, it should be understood that the belt 53 includes mesh openings throughout the top course 53*a* and bottom course 53*b*.

The first separation unit 25 may include a pulley 51 over which the belt 53 is wrapped at its bottom end where liquid and small solids are discharged. A pulley 51 extends across the length of the belt 53 and includes teeth that protrude through the belt openings during rotation to push material through the openings to reduce pluggage of the belt. The first separation unit 25 may include a scraper (e.g., rubber scraper) that contacts the material on the belt to direct the material to the next separation unit.

Figure 13:
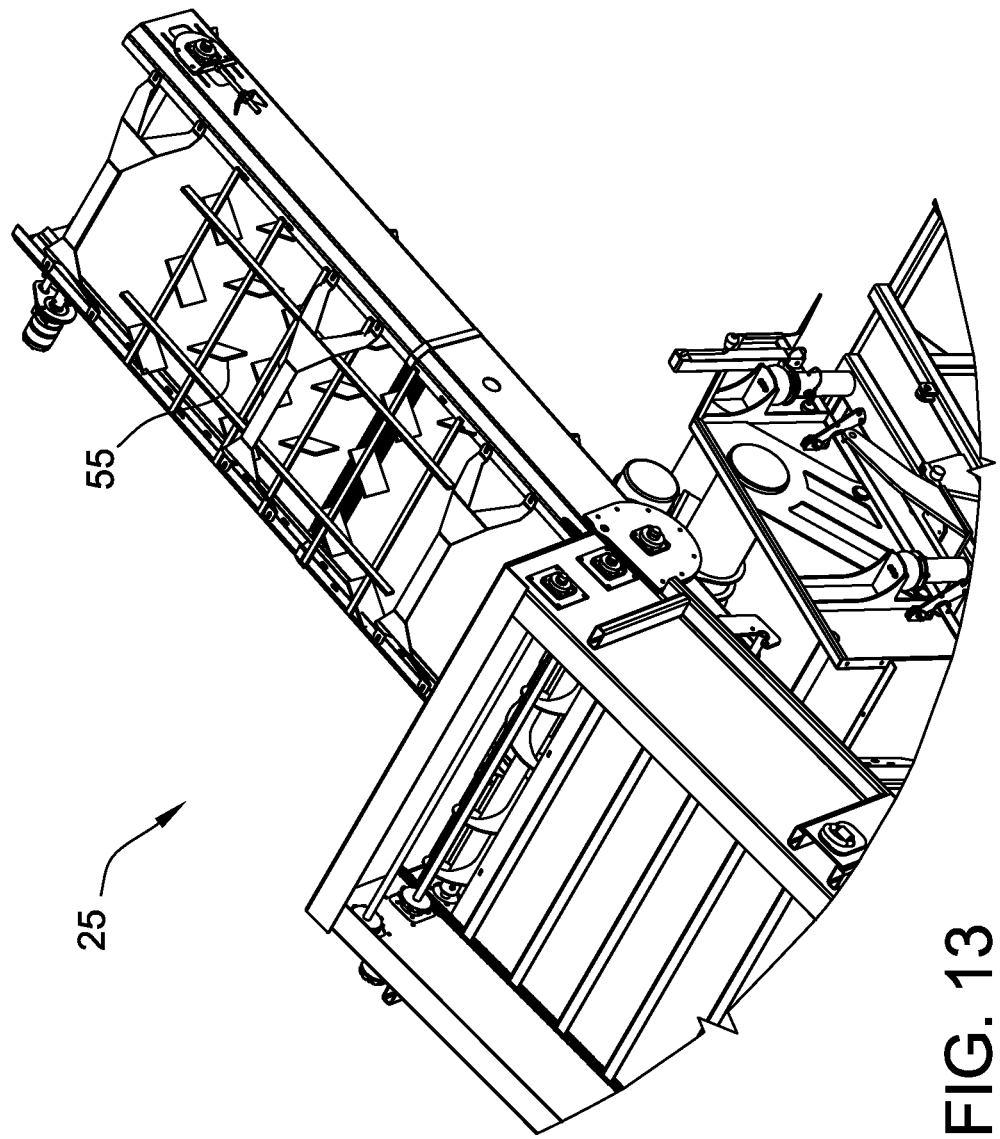
FIG. 13 is a perspective view of the first separation unit.
Figure 14:
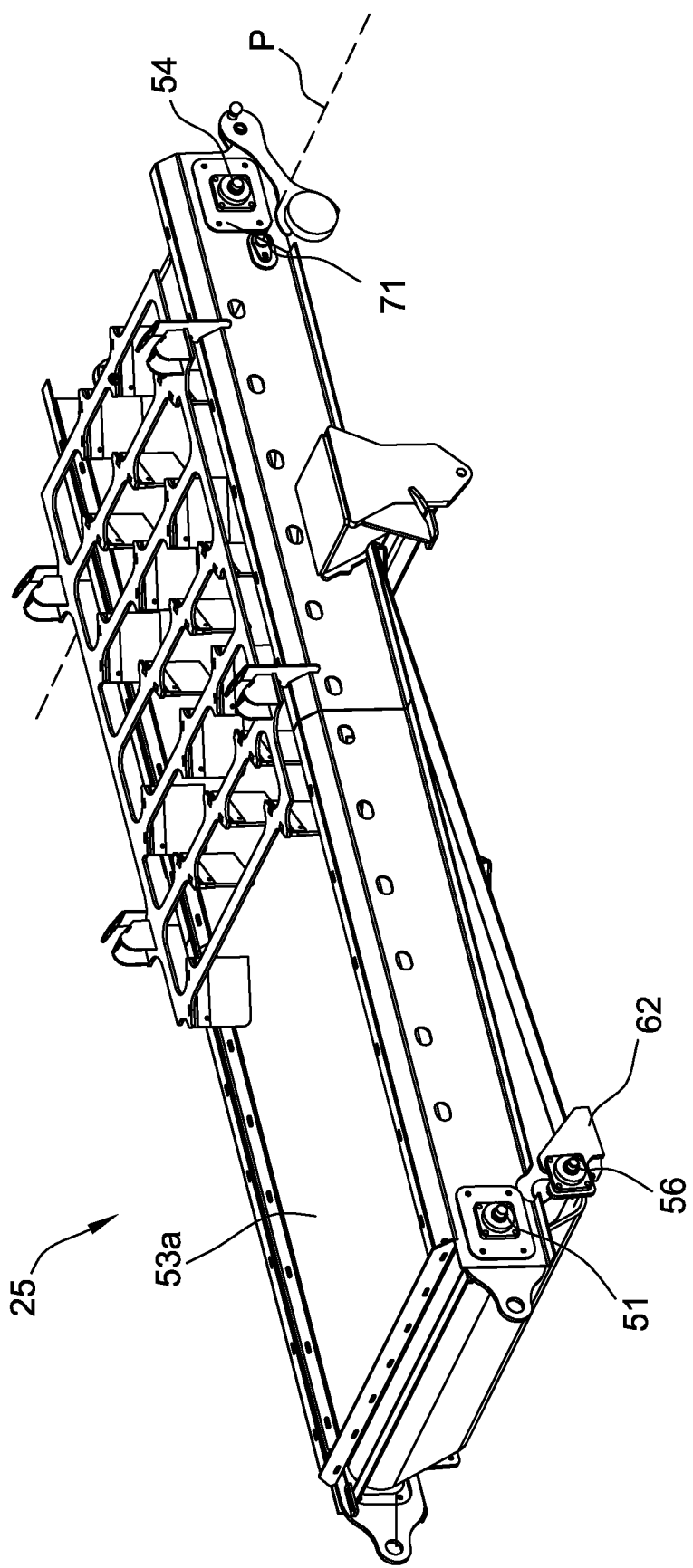
FIG. 14 is a perspective view of another embodiment of the first separation unit.
Figure 15:
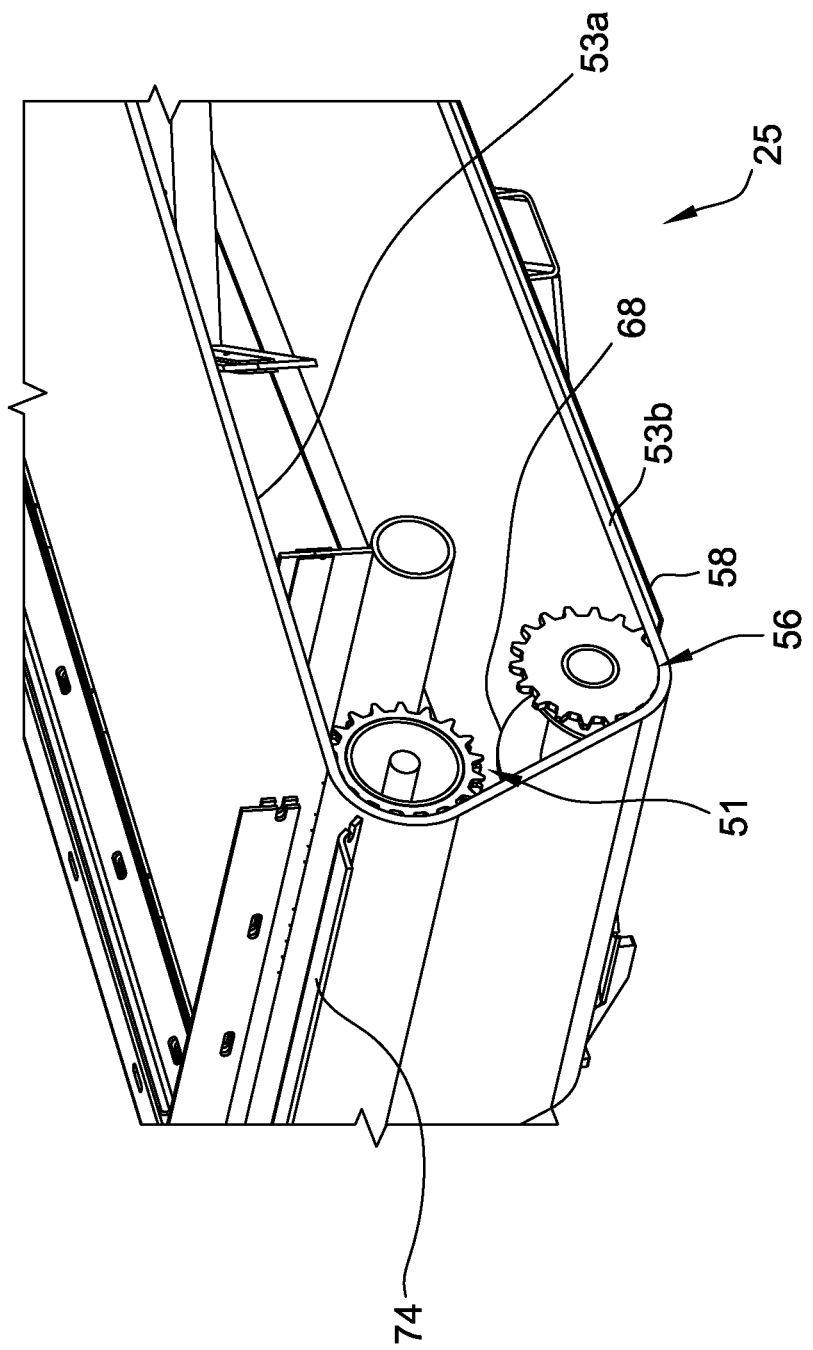
FIG. 15 is a detailed perspective cross-section view of the first separation unit showing a tail pulley and a tension pulley.
Figure 16:
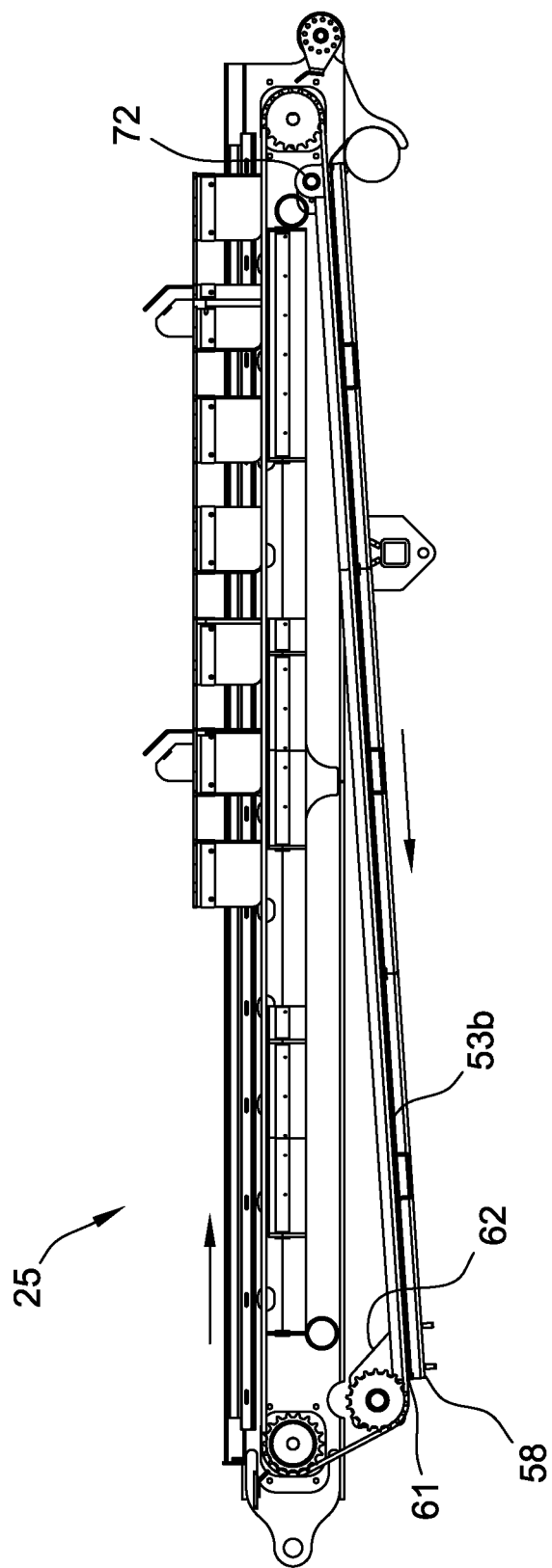
FIG. 16 is a cross-section view of the first separation unit.

In some embodiments in which the first separation unit 25 is a flat wire belt conveyor, the conveyor includes a series of deflectors 55 (FIG. 13) that act to turn or otherwise redirect solids that are moving forward on the conveyor 25. By turning the solids, additional fluid may fall through the conveyor and be recovered as effluent. In some embodiments, the deflectors 55 are angled relative to the direction of travel of the slurry to allow material to roll as it passes up the flat wire belt conveyor 25. The deflectors 55 may be arranged in rows with the rows being spaced from the walls of the conveyor to prevent material from being driven into the wall.

Figure 17:
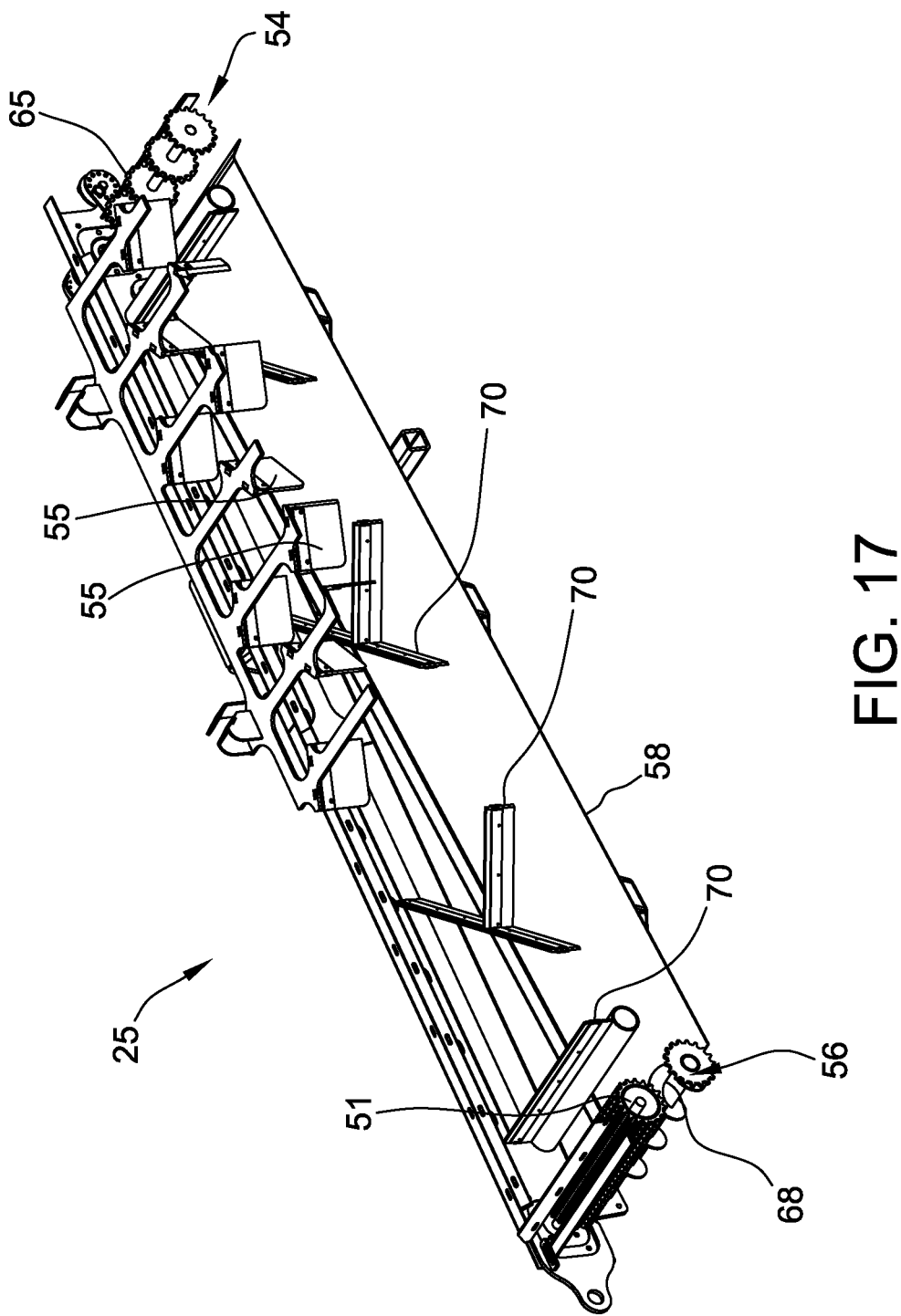
FIG. 17 is a perspective cross-section view of the first separation unit with the belt not shown.
Figure 18:
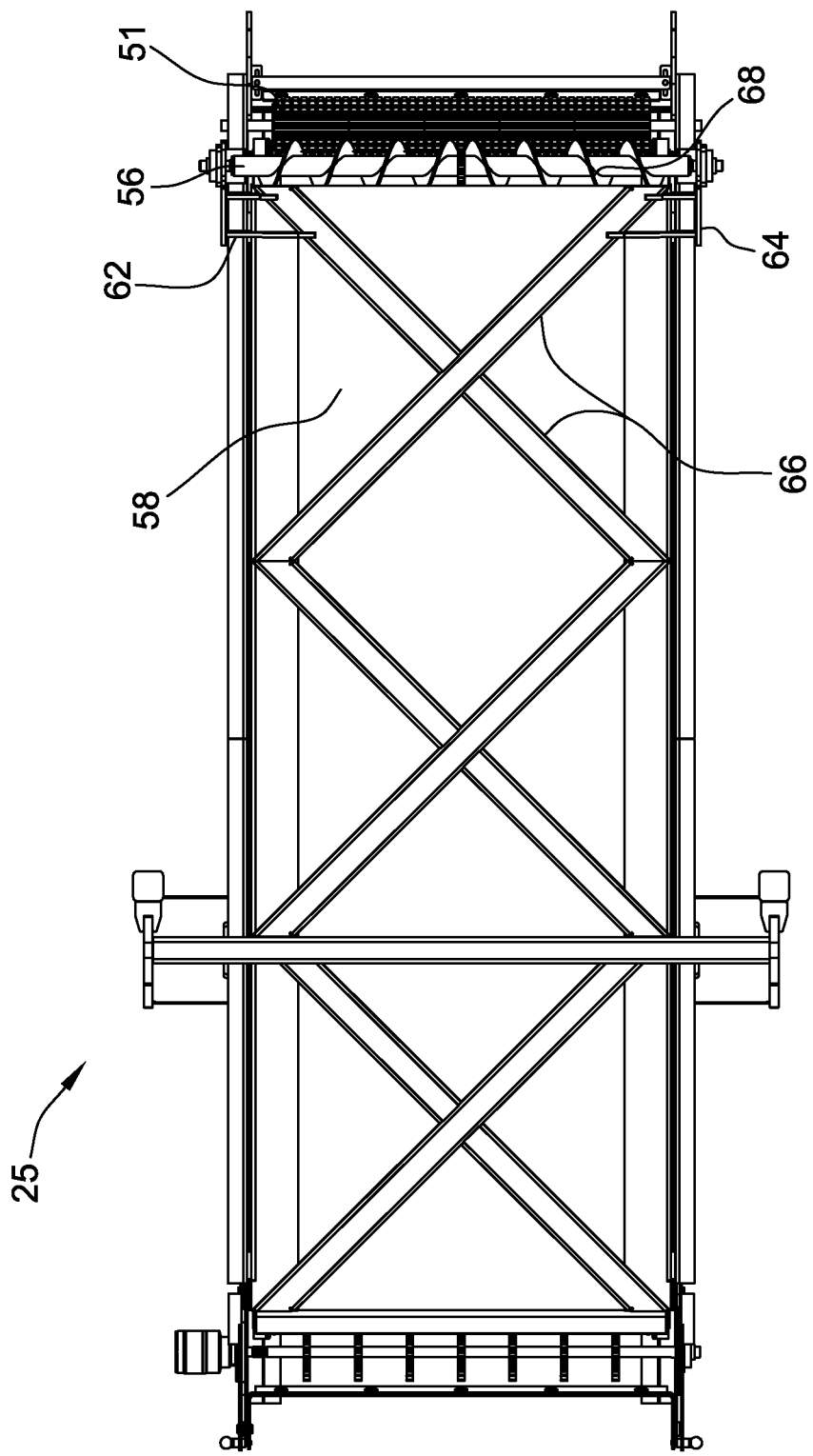
FIG. 18 is a bottom view of the first separation unit with the belt now shown.

Another embodiment of the first separation unit 25 in which the separation unit is a flat wire belt conveyor is shown in FIGS. 14-18. The separation unit 25 includes a tail pulley 51 and head pulley 54 over which the open mesh belt 53 is wrapped. As illustrated in FIGS. 14-18, the head pulley 54 is the drive pulley. The separation unit 25 also includes a tension pulley 56 to maintain tension in the belt 53. The tension pulley 56 is secured within first and second brackets 62, 64 (FIG. 18). The brackets 62, 64 are attached to a support frame 66 that supports the floor 58.

The floor 58 is attached to two pins 71, 72 (FIGS. 14 and 16) disposed towards the end of the unit 25 at which solids are discharged. The pins 71, 72 define a pivot axis P about which the floor 58 pivots. In this arrangement, the floor 58, support frame 66 and tension pulley 56 may move up and down toward the loading end of the separation unit 25. The weight of the floor 58, support frame 66 and tension pulley 56 maintains tension on the belt 53.

Figure 19:
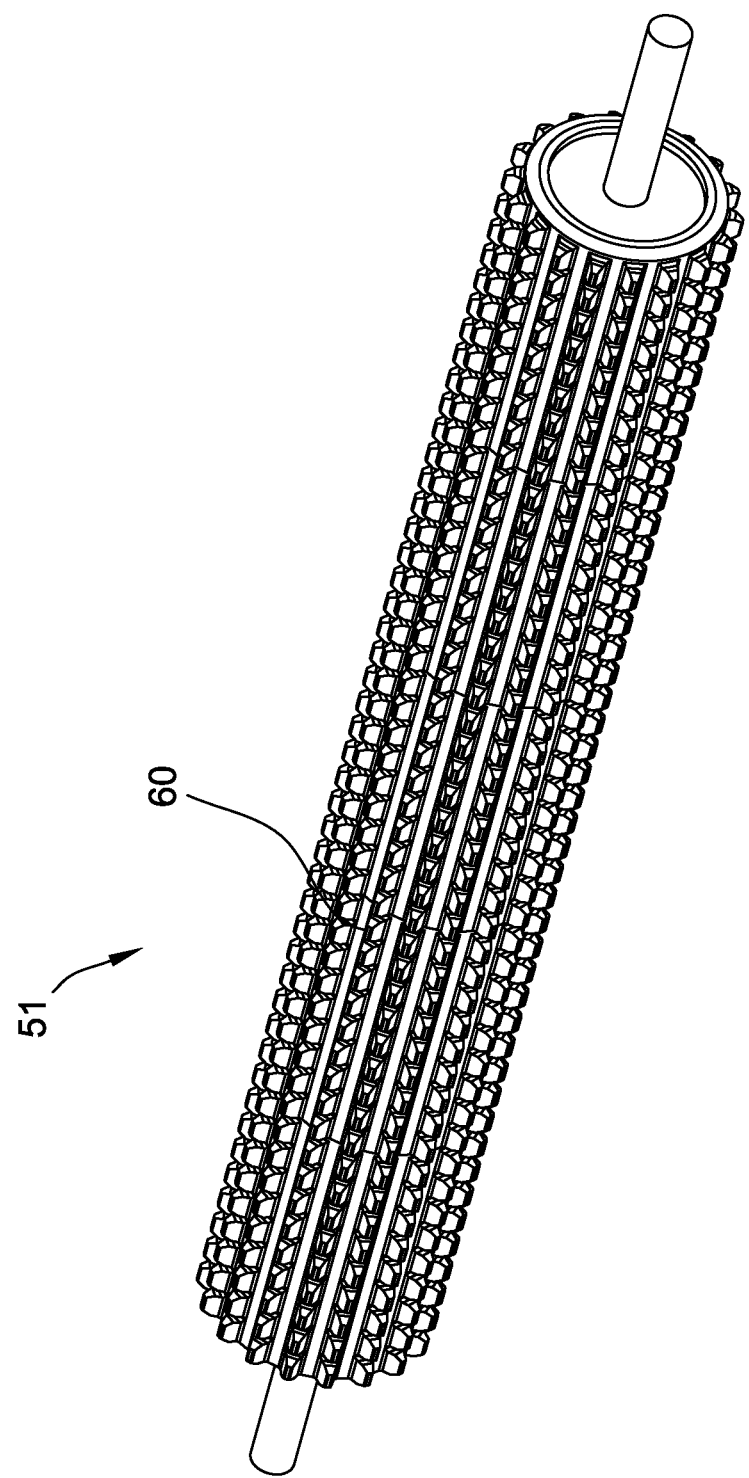
FIG. 19 is a perspective view of the tail pulley.

The tail pulley 51 extends across the width of the belt 53 and includes teeth 60 (FIG. 19) that protrude through belt mesh openings (preferably through at least 50%, 75%, 90% or through each mesh opening) during rotation to push material bound within the belt through the openings to reduce pluggage of the belt.

In some embodiments, the openings 80 of the belt 53 (FIG. 20) are staggered. The belt 53 includes undulating wires or bands 88, with rods 94 which extend through the bands 88. Each band 88 is connected to two rods 94. In such embodiments, in a row 82 of openings 80, the centerline $CL_1$ of one set of opening 80A is offset from the centerline $CL_2$ of adjacent openings 80B. The width of the offset is $W_1$.

Figure 20:
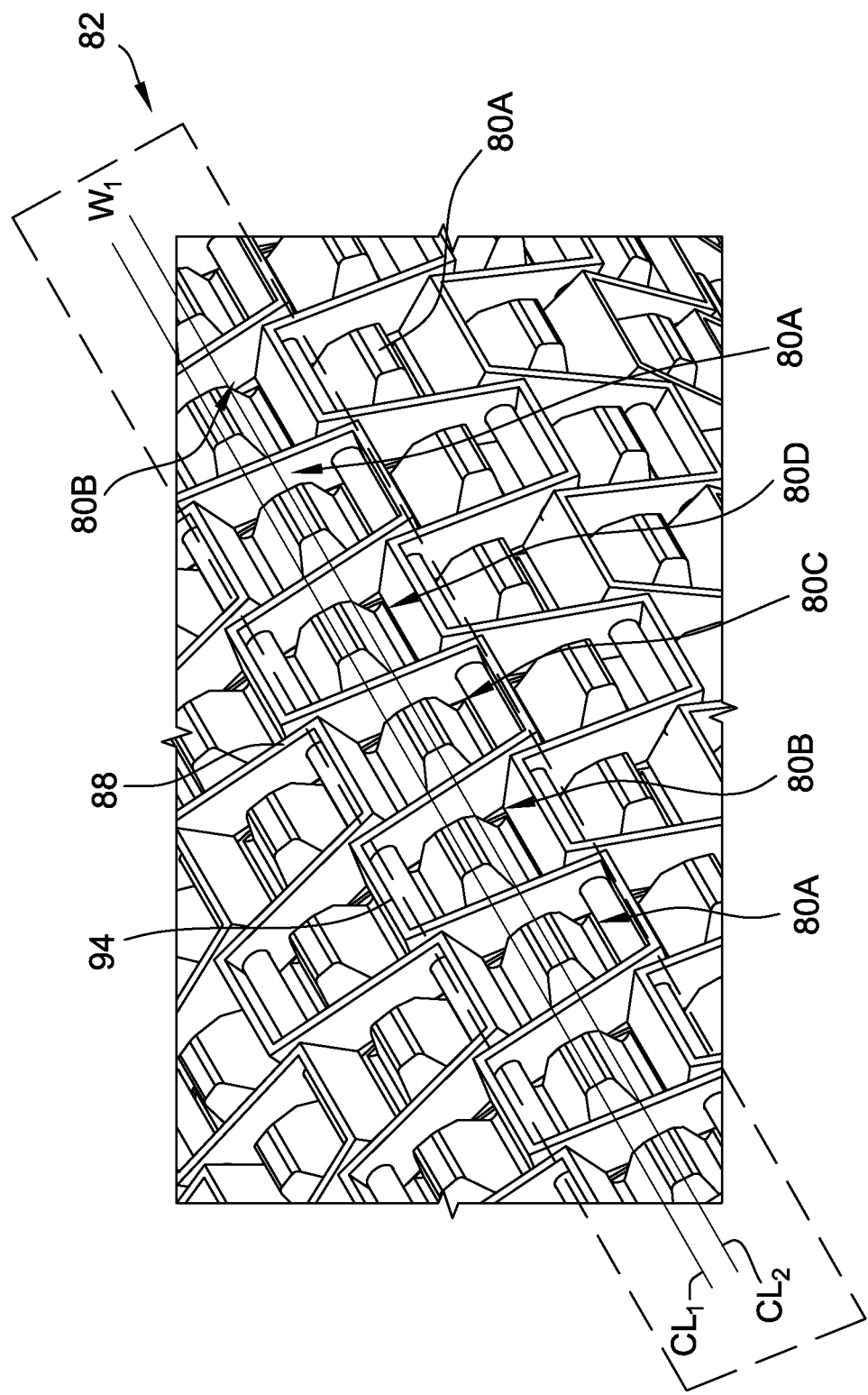
FIG. 20 is a detailed perspective view of an embodiment of the first separation unit showing the belt and tail pulley.
Figure 21:
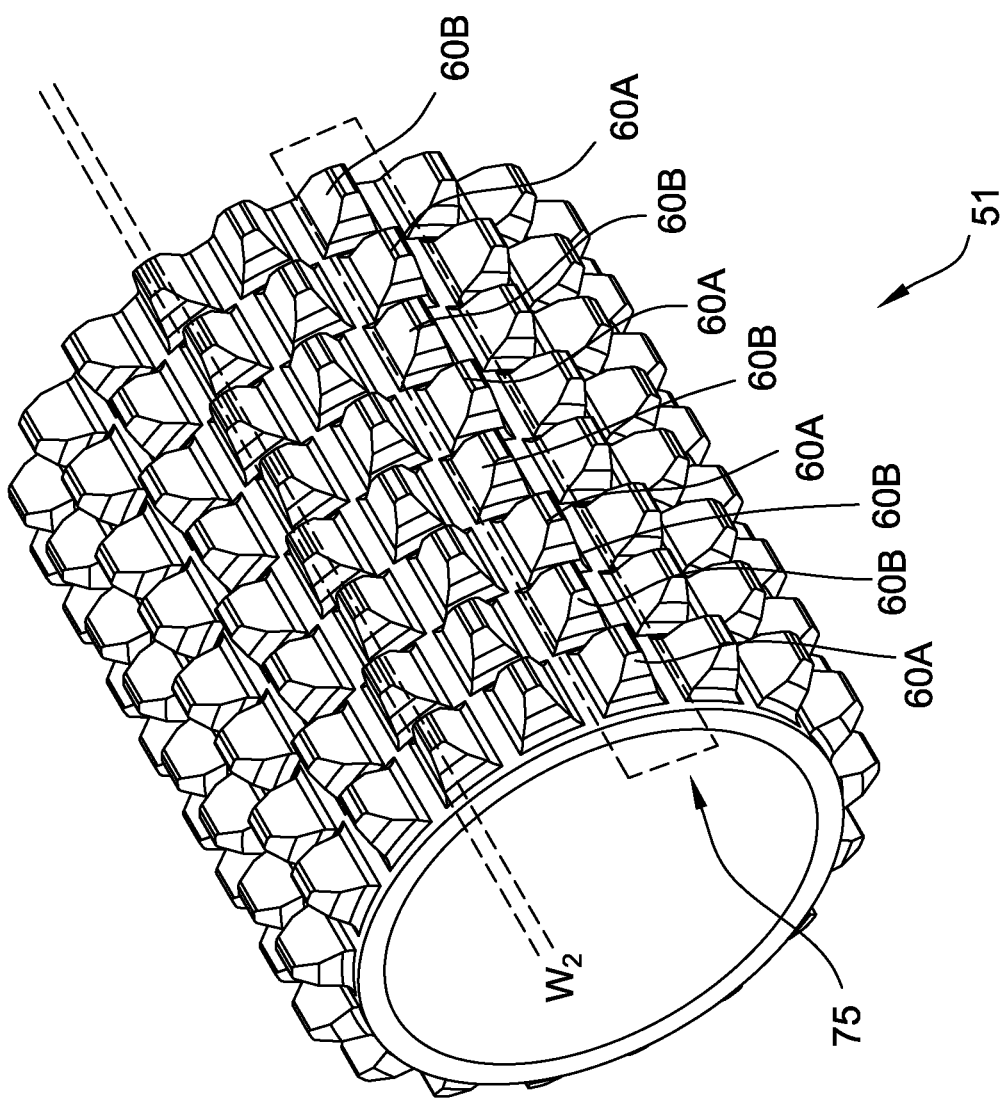
FIG. 21 is a perspective cross-section view of the tail pulley of FIG. 20.

In some embodiments, the teeth 60 of the tail pulley 51 are configured to match the offset of the openings 80. Referring now to FIG. 21 the teeth 60 in each row 75 of the tail pulley 51 are circumferentially staggered. One set of teeth 60A is offset from adjacent teeth 60B. The teeth 60 in each row are offset by a distance $W_2$. The offset $W_2$ of the teeth 60 is substantially equal to the offset $W_1$ between the centerlines $CL_1$, $CL_2$ of the belt openings 80 (FIG. 20).

With reference to FIG. 17 in which the belt is not shown, the head pulley 54 includes sprockets 65 that are spaced to rotate the belt 53 around the head pulley 54. The tension pulley 56 includes an auger 68 to convey solids that pass through the first course 53a (FIG. 15) of the belt but do not pass through the lower course 53b. In the illustrated embodiment, the auger 53 has a bi-directional pitch (i.e., one auger flight promotes conveying material from the center of the belt to the left and a second flight conveys material from the center to the right of the belt) to move material off the belt. Such a bi-directional auger may also keep the belt 53 centered.

The separation unit 25 includes a scraper 74 (FIG. 15), which may be made of a flexible material such as rubber, that contacts the belt 53 while it rotates. The scraper 74 removes material from the belt while the teeth 60 of the tail pulley 51 engage the belt 53. The separation unit 25 includes a plurality of belt supports 70 that support the weight of the belt 53 and solids loaded on the belt as the belt 53 moves toward the head pulley 54. The separation unit 25 also includes a series of deflectors 55 that are arranged in rows and are angled relative to the direction of travel of the slurry to turn or otherwise redirect solids that are moving forward on the conveyor 25.

Figure 11:
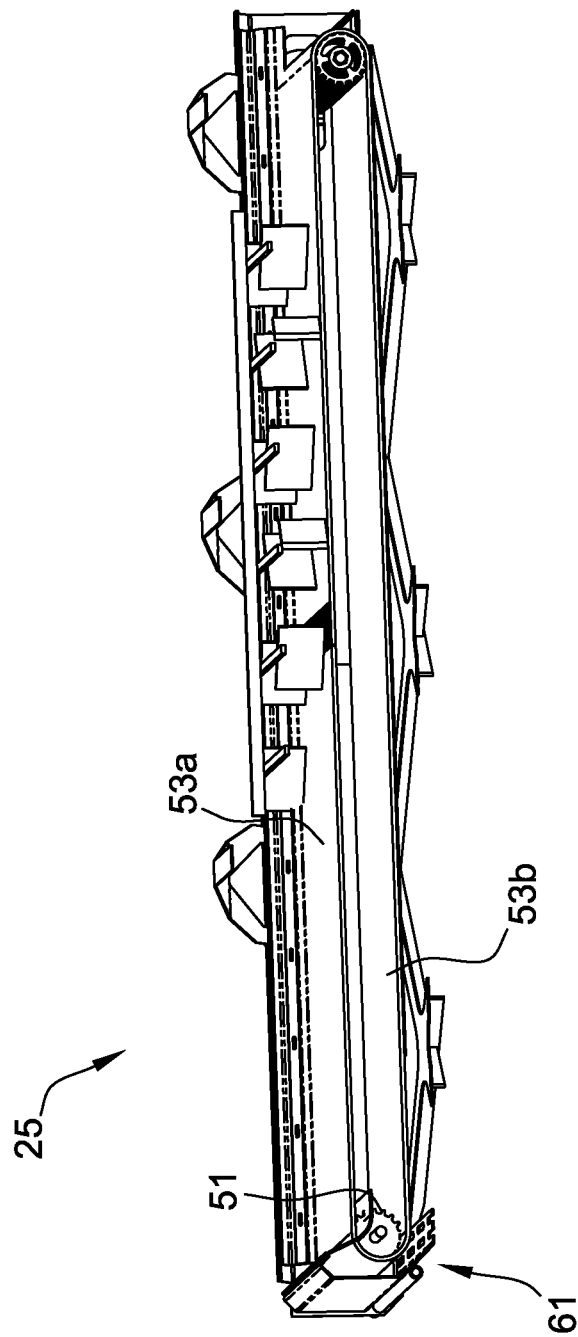
FIG. 11 is a cross-section side view of a first separation unit of the system.

As slurry contacts the open mesh of the flat wire belt 53, the slurry falls through both the top and bottom courses 53a, 53b of the belt and slides downward on a floor 58 (FIG. 10) of the conveyor 25 and falls through outlet 61 (FIG. 11). Larger clumps of material are carried by the upper course 53a of the belt and may fall within a first collection vessel (not shown) at the solid discharge end of the belt. The collection vessel may be any storage unit (e.g., bin, dumpster, loader bucket, ground pile, roll-off bin, dump truck and the like) that is suitable for storing solids and/or which allows the solids to be transported. In some embodiments, one or more additional conveyors (not show) are used to convey the larger clumps of material to the collection vessel. After the first collection vessel fills or processing is complete, the solids in the collection vessel may be disposed (e.g., used in construction or landfilled) or further processed.

In some embodiments, the first separation unit 25 is a shaker with spaced bars or screens that are caused to vibrate to remove larger solids.

Figure 12:
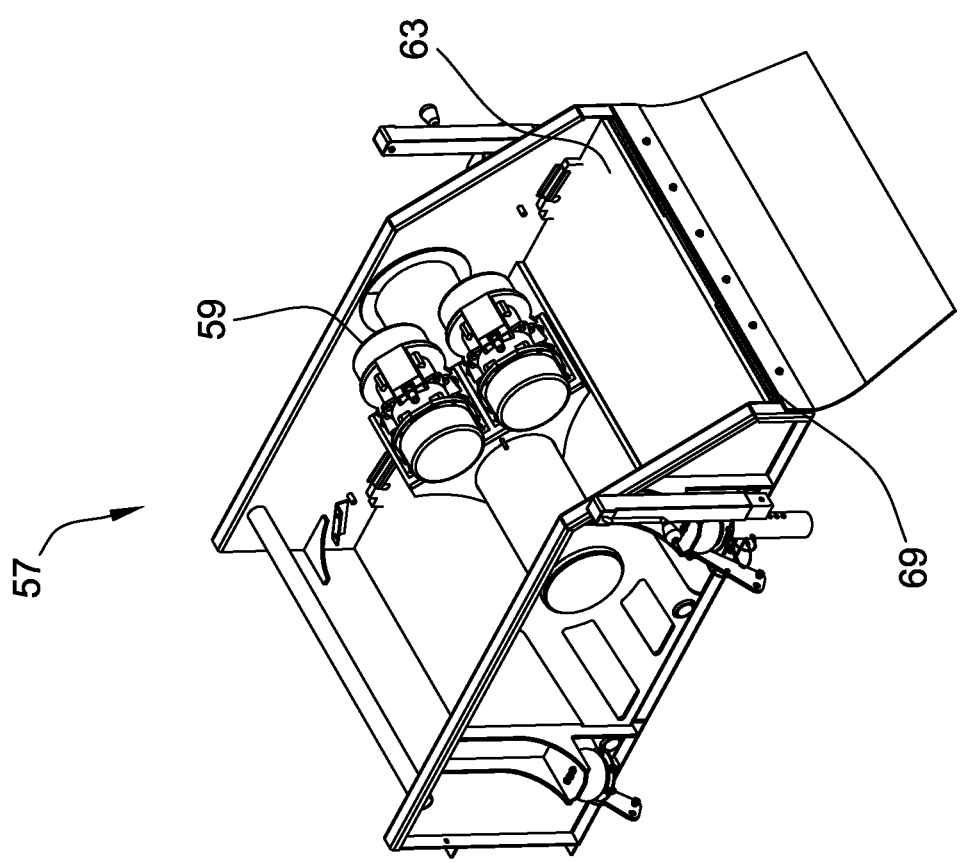
FIG. 12 is a perspective view of a second separation unit of the system.

The effluent from the first separation unit 25 that passes through the unit is discharged into a second separation unit 57 (FIGS. 1 and 12). In the illustrated embodiment, the second separation unit 57 is a vibratory screen unit, more commonly referred to as a "shaker", that includes screen openings to further separate a liquid fraction from the solid fraction in the effluent discharged from the first separation unit 25. In some embodiments, the mesh size of the screen may be from about 45 μm to about 500 μm. The shaker 57 includes vibratory motors 59 (FIG. 12) that cause the screen 63 to vibrate. In some embodiments, the screen 63 is divided into multiple segments that can separately be changed out of the unit 25 for maintenance. As the screen 63 vibrates, effluent falls through openings within the screens 63 and particles that do not fit through the openings vibrate to the discharge end 69 of the unit 57. Solids that reach the discharge end 69 fall into a second collection vessel (not shown) that is suitable for storing solids and which allows the solids to be transported (e.g., bin, dumpster, loader bucket, ground pile, roll-off bin, dump truck or the like). In the case of drilling and/or potholing, the solids in the second collection vessel may be disposed by re-use in construction or may be landfilled.

The openings of the first separation unit 25 are generally larger than the openings of the second separation unit 57 such that the second separation unit 57 separates finer solids. The solids removed in the second separation unit 57 may include sand, medium-sized solid clods, gravel, sticks grass and the like.

In embodiments in which the second separation unit 57 is a shaker, the shaker may be tilted forward or backward to modify the distribution of materials that pass through the screen and those that vibrate off the screen. In this regard, solids may be capable of moving up the screen when tilted back (i.e., move vertically upward) due to the vibratory action of the screen.

The second effluent that passes through the openings of the second separation unit 57 is collected in a collection system having a collection tank 67 (FIG. 1). The second effluent is generally a fluid that may be further processed in various reclamation units for further dewatering and/or purification. Such downstream processes and units are generally not part of the system described herein unless stated differently. In this regard, the described system may include various modifications and additional processing and unit operations unless stated otherwise. In some embodiments, the system consists of or consists essentially of the dumping station, first separation unit, second separation unit, collection vessels and any additional conveying units.

The illustrated embodiment of the system 1 shown in FIGS. 1-13 and 22 is an in-line system in which the unit operations (e.g., dumping station, conveyance to first separation unit, first and second separation units) are arranged such that a common longitudinal axis B intersects each unit operation. Further, slurry is processed such that it generally moves forward along the longitudinal axis B to the collection vessels and not perpendicular to the axis B. In some embodiment, the system is not in-line and some unit operations may be arranged perpendicular to each other.

In some embodiments, the system 1 is mobile which allows it to be transferred to different sites. For example, the system may be transported from a first site to a second site at which the system is centrally located between multiple drilling sites. The system 1 may include skids 73 (FIG. 1), rollers (not shown) or legs which may be vertically extended (not shown) to allow the system to be pulled or lifted onto a transport vehicle (e.g., trailer). In other embodiments, the system 1 includes ground-engaging wheels (or even tracks) for moving the system 1. The system 1 (e.g., components of dumping station and first and second separation units) may be connected by a common frame to allow for ease of transport and/or provide greater stability when assembled.

In some embodiments, the system 1 includes a dumping station 2 and a mixing system such as the mixing system disclosed in U.S. Patent Publication No. 2017/0028366, which is incorporated herein by reference for all relevant and consistent purposes. For example and as shown in FIG. 22, the dumping station 2 may discharge into an additive mixing unit 92 in which discharged slurry is mixed with additives A. Such additives include materials that act to harden the slurry in one or more downstream unit operations and include, for example, absorbent polymers, wood pellets, saw dust, ag lime, compost and dry soil. The dumping station 2 and additive mixing unit 92 may be in-line. Downstream mixing and/or processing may also be in-line or may be transverse to the flow of material from the dumping station 2.

The dumping station 2 and powered material hopper 90 may each be mobile (e.g., include skids, wheels, legs and the like and/or have a width less than a legal highway transport width such as 102 inches or less). The dumping station 2 and powered material hopper 90 may be connected through a common frame and transported together or may be transported as separate components.

In some embodiments, the system 1 includes a control station which controls operation of the dumping station 2 and/or downstream additive mixing units 92. Fluid and slurry volumes may be monitored to control the speed of the transfer mechanisms to optimize flow rate for separation and to utilize flow rate to determine additive input.

To operate the system 1, a first vehicle (not shown) is positioned at the dumping station 2 (FIG. 1) and slurry (e.g., drill or potholing cuttings) from the first vehicle is ejected from the vehicle into the holding tank 17. Slurry is conveyed from the holding tank 17 by the conveyor 21, which lifts the slurry to allow it to be discharged into the first separation unit 25. The first separation unit 25 separates a solid fraction from a liquid fraction to form a first solids-depleted effluent and a first solids fraction that is discharged into a collection vessel (not shown). The solids-depleted effluent from the first separation unit 25 is introduced into the second separation unit 57 to separate material from the first solids-depleted effluent to form a second solids-depleted effluent and a second solids fraction that is discharged into a second collection vessel (not shown). The second solids-depleted effluent includes less solids than the first solids-depleted effluent. The second solids depleted effluent is collected in collection tank 67 (e.g., for further processing or storage).

The system 1 is capable of continuous operation in that the system may begin to process slurry (e.g., begin to convey slurry forward) while the first vehicle is unloaded. Further, slurry may be ejected from a second vehicle (and subsequent vehicles) into the holding tank 17 while the slurry from the first vehicle is being processed (i.e., conveyed to the first separation unit and processed in first and second separation units 25, 57).

Compared to conventional systems for dewatering earthen slurries such as slurries that include earth cuttings, the system described herein has several advantages. The system allows for simultaneous processing and dumping of slurries from transport vehicles (e.g., vacuum excavators) which allows vehicles to be dumped without waiting for processing of a previous load to complete. In embodiments in which a drag-slat conveyor is used, the drag-slat conveyor allows the slurry to be removed on a continuous basis and lifted rather than being "dumped" from the holding tank. Lifting of the slurry by the conveyor also allows the system to have stacked portions which allows the system to be more compact. The drag-slat conveyor scrapes the bottom of the holding tank which allows it to be self-cleaning. This allows material to be removed even if solids have settled in the tank.

Using a relatively compact system allows the system to be mobile (e.g., through skids, rollers or wheels) which allows the system to be transported to different sites to, for example, locate the system at an accessible, central site between drill sites. In embodiments in which the system is arranged for "in-line" processing, the width of the system may be reduced which allows the system to be more easily transported.

Use of a first separation unit (e.g., flat wire belt conveyor) before the second separation unit (e.g., shaker) helps prevent the second unit from "blinding" which allows the system to operate without continuous monitoring by an operator. The first separation unit also reduces wear and damage of the second separation unit by removing larger solids before they contact the second unit. Use of a flat-wire belt conveyor as the first separation unit allows larger solids to move and prevents materials from sticking due to the conveying motion of the belt. This allows the system to work well to dewater all soils, including loam and clay which tend to have large clumps. Other units such as shakers may have difficulty in moving large solids and the solids tend to stick in the larger openings. In embodiments in which the first separation unit is a flat wire belt conveyor, use of deflectors to turn the solids allows the material to be better dewatered.

In embodiments in which the first separation unit is a flat wire belt conveyor and includes a tension pulley (e.g., FIGS. 14-18), by maintaining the belt under tension, the belt does not need adjustment if stretched. When the loading on the belt changes, the floor and tension pulley may correspondingly pivot up or down which allows the belt tension to be relatively constant which may improve the durability of the separation unit. This arrangement also allows the separation unit to provide a variable amount of belt slack which reduces the frequency at which the belt is tensioned. In embodiment in which the tail pulley of the flat wire belt conveyor includes teeth that protrude through most openings of the mesh belt, better dewatering may be achieved relative to embodiments in which only the head pulley includes such teeth. In embodiments in which the teeth are circumferentially staggered within each row of teeth, the teeth may better match the opening profile of the mesh belt which allows larger teeth to be used which achieves better cleanout of the mesh openings.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A mobile system for processing earthen slurries having a liquid fraction and a solid fraction, the system comprising:
    a holding tank;
    a drag-slat conveyor having a loading end and a discharge end, the loading end extending into the holding tank to remove slurry from the holding tank;
    a separation unit disposed below the discharge end of the drag-slat conveyor, the separation unit having openings for separating the solid fraction from the liquid fraction; and
    wheels or tracks for moving the system.

2. The mobile system as set forth in claim 1 comprising a discharge auger or chute positioned at the discharge end of the drag-slat conveyor, the discharge auger or chute being configured to aggregate the solid fraction into one or more outlets.

3. The mobile system as set forth in claim 1 wherein the drag-slat conveyor is angled to convey slurry vertically and longitudinally toward the separation unit.

4. The mobile system as set forth in claim 1 wherein the separation unit is a first separation unit, the first separation unit having an outlet for discharging a first effluent that passes through the first separation unit, the system further comprising a second separation unit having openings for separating the solids fraction from the liquid fraction from the first effluent from the first separation unit, the first separation unit having openings with a size greater than the size of the openings of the second separation unit.

5. A mobile system for processing earthen slurries having a liquid fraction and a solid fraction, the system comprising:
    a holding tank;
    a drag-slat conveyor having a loading end and a discharge end, the loading end extending into the holding tank to remove slurry from the holding tank;
    a separation unit disposed below the discharge end of the drag-slat conveyor, the separation unit having openings for separating the solid fraction from the liquid fraction; and
    skids or rollers for loading and/or unloading the system onto a vehicle.

6. The mobile system as set forth in claim 5 wherein the separation unit is a first separation unit, the first separation unit having an outlet for discharging a first effluent that passes through the first separation unit, the system further comprising a second separation unit having openings for separating the solids fraction from the liquid fraction from the first effluent from the first separation unit, the first separation unit having openings with a size greater than the size of the openings of the second separation unit.

7. A mobile system for processing earthen slurries having a liquid fraction and a solid fraction, the system comprising:
    a holding tank;
    a drag-slat conveyor having a loading end and a discharge end, the loading end extending into the holding tank to remove slurry from the holding tank;
    a first separation unit disposed below the discharge end of the drag-slat conveyor, the first separation unit having openings for separating the solid fraction from the liquid fraction, the first separation unit having an outlet for discharging a first effluent that passes through the first separation unit;
    a second separation unit having openings for separating the solids fraction from the liquid fraction from the first effluent from the first separation unit, the first separation unit having openings with a size greater than the size of the openings of the second separation unit; and
    a collection system for collecting a second effluent that passes through the openings of the second separation unit.

8. The mobile system as set forth in claim 7 wherein the second separation unit is a vibratory screen.

9. The mobile system as set forth in claim 7 having skids or rollers for loading and/or unloading the system onto a vehicle or having wheels or tracks for moving the system.

10. The mobile system as set forth in claim 7 wherein the holding tank and drag-slat conveyor are part of a dumping station for receiving earthen slurries, the dumping station comprising first and second ramps for maneuvering vehicles onto and off of the dumping station.

11. A mobile system for processing earthen slurries having a liquid fraction and a solid fraction, the system comprising:
    a holding tank;
    a drag-slat conveyor having a loading end and a discharge end, the loading end extending into the holding tank to remove slurry from the holding tank, the drag-slat conveyor comprising slats to drag slurry upward, each slat having first and second flare-out portions to cup the slurry as it is conveyed along the drag-slat conveyor; and
    a separation unit disposed below the discharge end of the drag-slat conveyor, the separation unit having openings for separating the solid fraction from the liquid fraction.

12. The mobile system as set forth in claim 11 having skids or rollers for loading and/or unloading the system onto a vehicle or having wheels or tracks for moving the system.

13. The mobile system as set forth in claim 11 wherein the holding tank and drag-slat conveyor are part of a dumping station for receiving earthen slurries, the dumping station comprising first and second ramps for maneuvering vehicles onto and off of the dumping station.

14. A mobile system for processing earthen slurries having a liquid fraction and a solid fraction, the system comprising:
    a holding tank;
    a drag-slat conveyor having a loading end and a discharge end, the loading end extending into the holding tank to remove slurry from the holding tank, the drag-slat conveyor comprising slats to drag slurry upward, the slats being flexible to allow the slats to scrape and seal a drag-slat conveyor floor; and
    a separation unit disposed below the discharge end of the drag-slat conveyor, the separation unit having openings for separating the solid fraction from the liquid fraction.

15. The mobile system as set forth in claim 14 having skids or rollers for loading and/or unloading the system onto a vehicle or having wheels or tracks for moving the system.

16. The mobile system as set forth in claim 14 wherein the holding tank and drag-slat conveyor are part of a dumping station for receiving earthen slurries, the dumping station comprising first and second ramps for maneuvering vehicles onto and off of the dumping station.

17. A mobile system for processing earthen slurries having a liquid fraction and a solid fraction, the system comprising:
    a holding tank;
    a drag-slat conveyor having a loading end and a discharge end, the loading end extending into the holding tank to remove slurry from the holding tank, the holding tank and drag-slat conveyor being part of a dumping station for receiving earthen slurries, the dumping station comprising first and second ramps for maneuvering vehicles onto and off of the dumping station; and a separation unit disposed below the discharge end of the drag-slat conveyor, the separation unit having openings for separating the solid fraction from the liquid fraction.

18. The mobile system as set forth in claim 17 wherein the dumping station has an open end for unloading slurry from a vehicle positioned on the ground that supports the system.

19. The mobile system as set forth in claim 17 wherein the dumping station enables slurry to be continuously transferred to the separation unit.

20. The mobile system as set forth in claim 17 having skids or rollers for loading and/or unloading the system onto a vehicle or having wheels or tracks for moving the system.

* * * * *